US006181433B1

(12) United States Patent
Hayama et al.

(10) Patent No.: US 6,181,433 B1
(45) Date of Patent: Jan. 30, 2001

(54) STAMP-MAKING METHOD AND APPARATUS

(75) Inventors: Hitoshi Hayama, Nagano; Kenji Watanabe, Tokyo; Takanobu Kameda, Tokyo; Tomoyuki Shimmura, Tokyo, all of (JP)

(73) Assignees: Seiko Epson Corporation; King Jim Co., Ltd., both of Tokyo (JP)

( * ) Notice: Under 35 U.S.C. 154(b), the term of this patent shall be extended for 0 days.

(21) Appl. No.: 09/252,958

(22) Filed: Feb. 18, 1999

Related U.S. Application Data

(63) Continuation of application No. 08/777,330, filed on Dec. 27, 1996, now Pat. No. 5,896,490.

(30) Foreign Application Priority Data

Dec. 28, 1995 (JP) .................................................. 6-341990

(51) Int. Cl.[7] .................................................. G06K 15/00

(52) U.S. Cl. .......................................... 358/1.12; 358/1.18

(58) Field of Search .................................. 358/1.12, 1.11, 358/1.18, 299, 296; 382/286, 296, 297, 293, 295, 287, 289, 290

(56) References Cited

U.S. PATENT DOCUMENTS

| | | |
|---|---|---|
| 4,714,957 | 12/1987 | Takano . |
| 5,344,247 | 9/1994 | Sakuragi et al. . |
| 5,469,514 | 11/1995 | Kawamura . |
| 5,508,810 | 4/1996 | Sato . |
| 5,617,481 | 4/1997 | Nakamura . |
| 5,675,671 | 10/1997 | Hayduchok et al. . |

FOREIGN PATENT DOCUMENTS

| | | | | |
|---|---|---|---|---|
| 62-159291 * | 7/1987 | (JP) | | G06K/9/20 |
| 04111117 * | 4/1992 | (JP) | | G06F/3/12 |
| 04148470 * | 5/1992 | (JP) | | G06F/15/20 |
| 9517309 | 6/1995 | (JP) . | | |
| 07152758 * | 6/1995 | (JP) | | G06F/17/24 |

* cited by examiner

*Primary Examiner*—Scott Rogers
(74) *Attorney, Agent, or Firm*—Hogan & Hartson, LLP

(57) ABSTRACT

There is provided a stamp-making method and apparatus therefor for making a square or circular stamp which can be accurately imprinted with reference to a top-indicating mark provided thereon, without discriminating the orientation of the stamp image engraved on the stamp surface thereof. There is formed first direction-oriented image data having each of a plurality of component elements of plate-making image data oriented in a first direction. When it is detected that it is difficult to discriminate orientation of the stamp body having the mark without reference to the mark, an instruction is given for arranging the image data in a manner oriented in a second direction. According to the instruction, the first direction-oriented image data is converted to a second direction-oriented image data in which the component elements of the plating-making image data are oriented in the second direction. A stamp body is engraved by the use of the second direction-oriented image data to thereby make a stamp.

30 Claims, 28 Drawing Sheets

M531

| | | | | | | | |
|---|---|---|---|---|---|---|---|
| 10 | 11 | 12 | 13 | 30 | 31 | 32 | 33 |
| 14 | 15 | 16 | 17 | 34 | 35 | 36 | 37 |
| 18 | 19 | 1A | 1B | 38 | 39 | 3A | 3B |
| 1C | 1D | 1E | 1F | 3C | 3D | 3E | 3F |
| 00 | 01 | 02 | 03 | 20 | 21 | 22 | 23 |
| 04 | 05 | 06 | 07 | 24 | 25 | 26 | 27 |
| 08 | 09 | 0A | 0B | 28 | 29 | 2A | 2B |
| 0C | 0D | 0E | 0F | 2C | 2D | 2E | 2F |

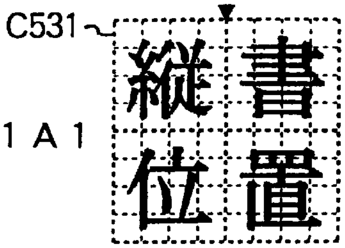
FIG. 21A1
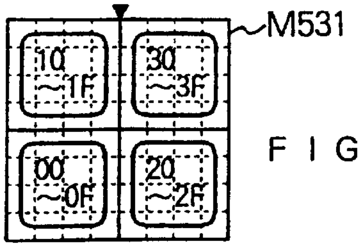
FIG. 21B1
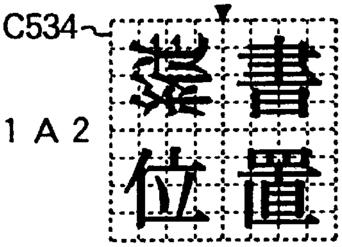
FIG. 21A2
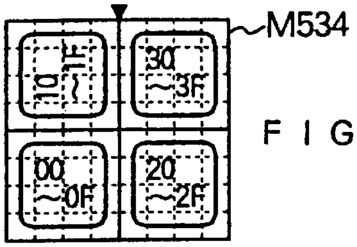
FIG. 21B2
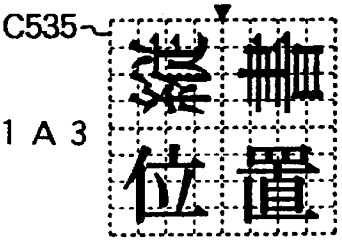
FIG. 21A3
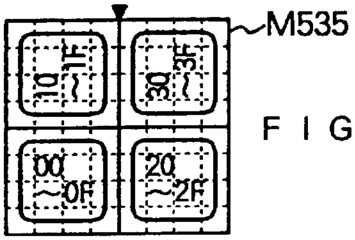
FIG. 21B3
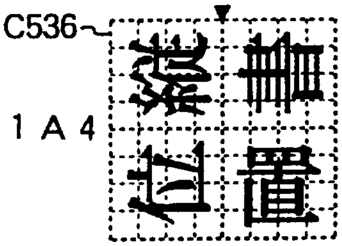
FIG. 21A4
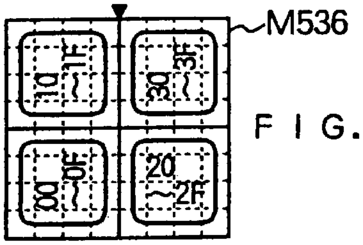
FIG. 21B4
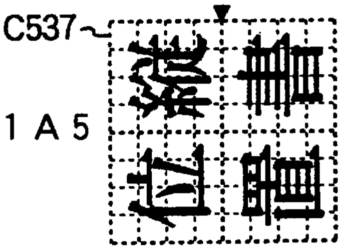
FIG. 21A5
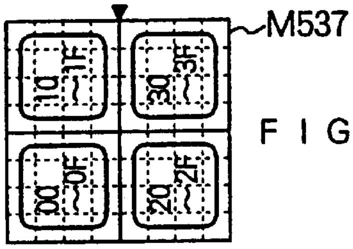
FIG. 21B5
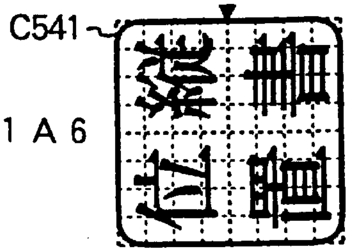
FIG. 21A6
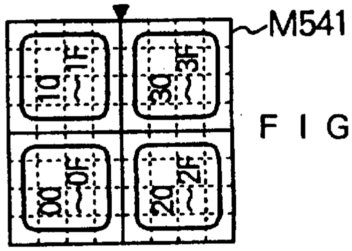
FIG. 21B6

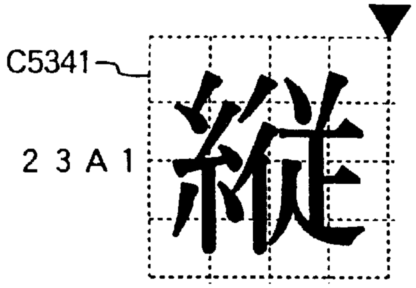
FIG. 23A1
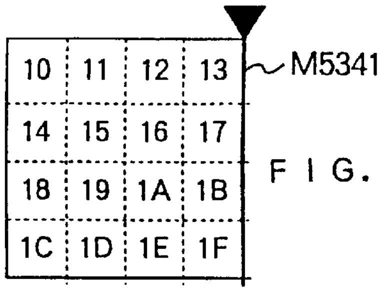
FIG. 23B1
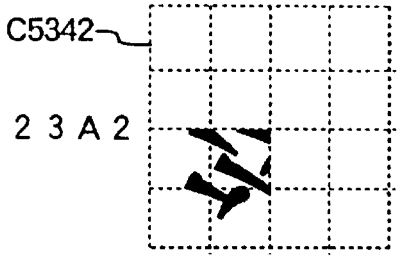
FIG. 23A2
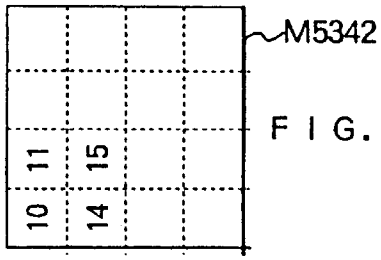
FIG. 23B2
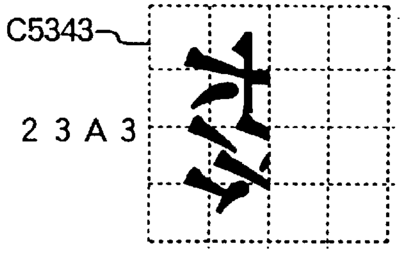
FIG. 23A3
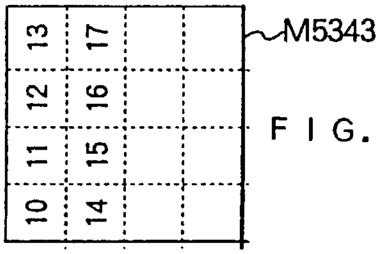
FIG. 23B3
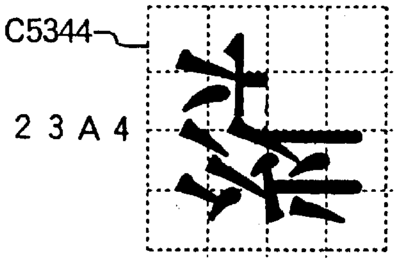
FIG. 23A4
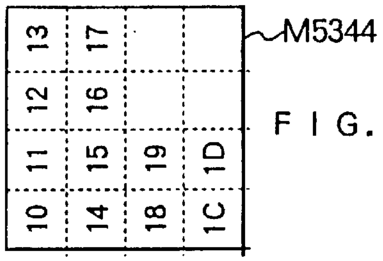
FIG. 23B4
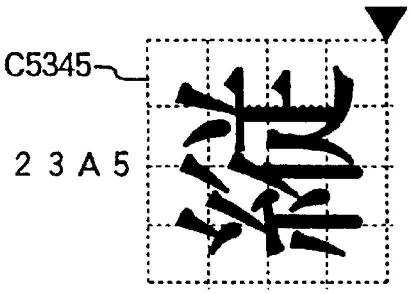
FIG. 23A5
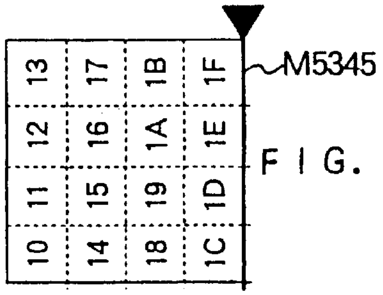
FIG. 23B5

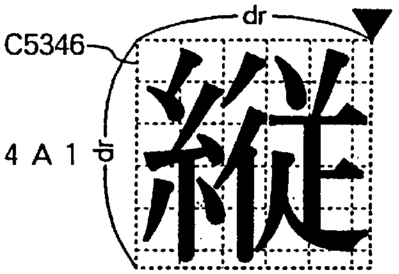
FIG. 24A1
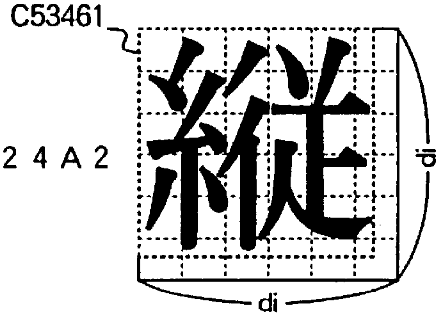
FIG. 24A2
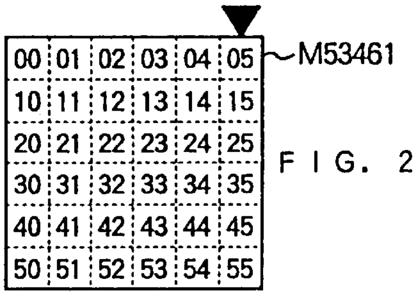
FIG. 24B2
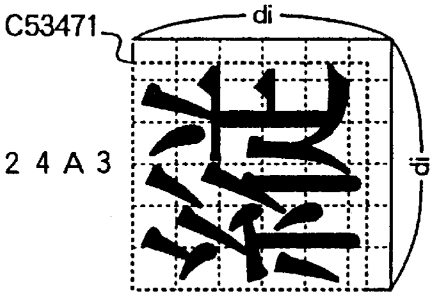
FIG. 24A3
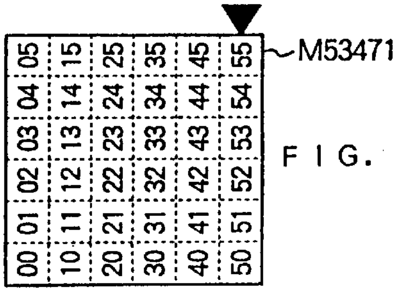
FIG. 24B3
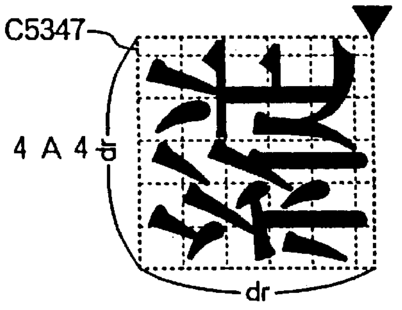
FIG. 24A4

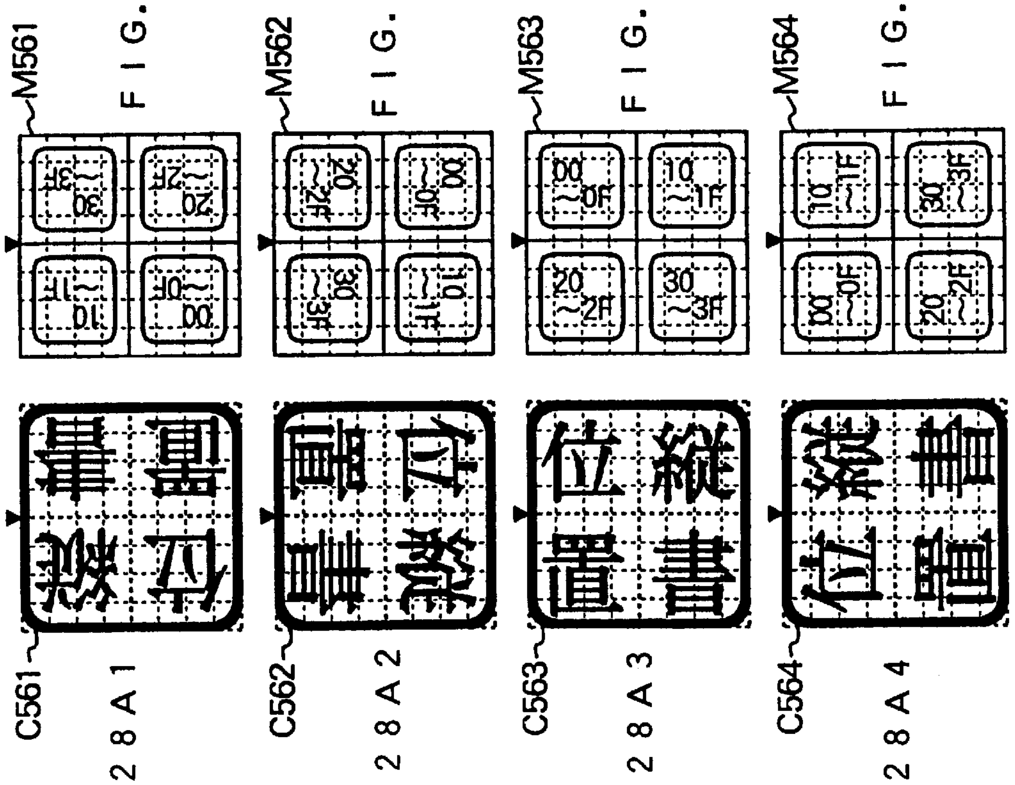
FIG. 28A1
FIG. 28B1
FIG. 28A2
FIG. 28B2
FIG. 28A3
FIG. 28B3
FIG. 28A4
FIG. 28B4

STAMP-MAKING METHOD AND APPARATUS

This is a continuation of application Ser. No. 08/777,330 filed Dec. 27, 1996, now U.S. Pat. No. 5,896,490 which is hereby incorporated by reference in its entirety.

BACKGROUND OF THE INVENTION

1. Field of the Invention

This invention relates to a method of making a stamp by engraving a stamp image oriented in a different direction from an ordinary one on a stamp body orientation of which is difficult to discriminate, such as one of a square stamp and one of a circular stamp, and an apparatus therefor.

2. Prior Art

Conventionally, a stamp-making apparatus engraves a stamp image on a stamp body loaded in a pocket formed in a body of the apparatus. The stamp body is set in the pocket with a longer side of a stamp surface thereof on the bottom of the pocket due to limitations of the shape of the pocket, and accordingly, images to be engraved in the stamp body, such as letters, figures, and symbols, are also mainly written or formed laterally, i.e. in lateral lines. Further, the stamp body is printed with a mark indicative of a top side of the stamp surface, and this mark is utilized in imprinting a stamp on an object. On the other hand, when a stamp body is to be engraved with vertical lines of images to obtain a vertically-written stamp, it is also set with a longer side of a stamp surface thereof on the bottom of the pocket due to the above limitations. Then, images of the stamp to be engraved in the stamp body, such as images of letters, formed in lateral lines, are each rotated anticlockwise through 90 degrees and arranged in order from left to right, whereby lines of characters which should be stamped vertically for being read from top to bottom of each line are realized. It should be noted that throughout the specification including claims appended hereto, the term “vertically-written” means that characters including letters and symbols (or their images) are arranged in a line or lines which should be read from top to bottom (or head to tail) of each line after they are set vertically for reading, as found in Japanese or Chinese writing.

When the vertically-written stamp has a larger vertical dimension, it is easy to discriminate the orientation of the stamp, so that the above-mentioned mark need not be utilized to avoid an erroneous lateral orientation of the stamp before imprinting a stamp. On the other hand, in the case of a vertically-written square stamp, it is difficult to discriminate the proper orientation of the stamp from its shape, and hence the above mark is necessary. Conventional vertically-written square stamps are, however, orientated sideways with respect to a direction indicated by the mark as can be understood from the above. That is, the mark is positioned at a side of the vertical lines of stamp image. Therefore, if such a conventional vertically-written square stamp is used to imprint a stamp on an object with reference to the mark in the same manner as a laterally-written square stamp, the stamp formed is oriented sideways. Therefore, users are required to carefully discriminate between vertically-written square stamps and laterally-written square stamps before applying them onto an object, and they are troublesome and not easy to use. Further, in the case of a circular stamp, there is not only a possibility of an imprinted stamp image being oriented laterally, but also a high possibility of the imprinted stamp image being orientated in a different angle from a proper one, so that it is still more necessary to provide a mark on a stamp, which serves an accurate indication of the top side of a stamp surface of the stamp.

SUMMARY OF THE INVENTION

It is a first object of the invention to provide a stamp-making method which is capable of making square stamps and circular stamps each having a mark indicative of a top side of a stamp surface thereof with reference to which accurate imprinting of a stamp image can be effected without discrimination of the orientation of the stamp image engraved on each stamp surface.

It is a second object of the invention to provide a stamp-making apparatus which is capable of making square stamps and circular stamps each having a mark indicative of a top side of a stamp surface thereof with reference to which accurate imprinting of a stamp image can be effected without discrimination of the orientation of the stamp image engraved on each stamp surface.

To attain the first object, according to a first aspect of the invention, there is provided a stamp-making method comprising the steps of setting a stamp body having a mark provided thereon in a manner such that the mark indicates a predetermined direction, forming first direction-oriented image data having each of a plurality of component elements of plate-making image data oriented in a first direction which is different from the predetermined direction, forming a second direction-oriented image data by causing whole of the first direction-oriented image data to be oriented in a second direction when it is detected that it is difficult to discriminate orientation of the stamp body having the mark without reference to the mark, and engraving the stamp body by the use of the second direction-oriented image data.

According to this stamp-making method, when it is detected that it is difficult to discriminate the orientation of the stamp body having the mark without reference to the mark, the first direction-oriented image data which is oriented in the first direction is converted to the second direction-oriented image data oriented in the second direction, and the resulting data is used as the stamp image data for use in the plate-making, whereby a circular or square stamp can be made which bears the top-indicating mark with reference to which the stamp body was set in the pocket of the stamp-making apparatus and, as a result of the above processing, can be suitably used as a guide when the stamp is imprinted. Therefore, the user can imprint the stamp properly with reference to the mark without discriminating the orientation of the stamp image engraved in the stamp surface.

Preferably, the whole of the first direction-oriented image data is caused to be oriented in the second direction in response to an instruction signal for causing the whole of the first direction-oriented image data to be oriented in the second direction.

According to this preferred embodiment, by generating the instruction signal manually or automatically, it is possible to designate conversion of the first direction-oriented image data to the second direction-oriented image data oriented in the second direction.

For example, the first direction-oriented image data is data of at least one line of vertically-written characters which extends in the first direction, and the second direction-oriented image data is data of at least one line of the vertically-written characters which extends in the second direction.

According to this preferred embodiment, when the vertical arrangement of vertically-written characters, i.e. arrangement of vertically-written characters in vertical lines (in the second direction) is instructed, predetermined vertically-written image data as image data of vertically-written characters arranged laterally (in the first direction) is converted to the vertically-arranged vertically-written character image data as image data of vertically-written characters arranged vertically (in the second direction), and the resulting image data is used in engraving the stamp body of a stamp, whereby it is possible to make a circular or square stamp which is vertically-written or vertically engraved and bears a top-indicating mark which is referred to in setting the stamp body in a proper position when the stamp image is engraved on the stamp body and can be utilized as it is for imprinting the stamp in a properly oriented manner.

Accordingly, the instruction signal is a signal instructing that the data of the at least one line of the vertically-written characters which extends in the first direction be converted to the data of the at least one line of the vertically-written characters which extends in the second direction.

Further preferably, the second direction-oriented image data is formed by rotating the first direction-oriented image data.

According to this preferred embodiment, conversion from the first direction-oriented image data to the second direction-oriented image data can be easily effected by thse use of conventional means of rotating image data.

Preferably, the rotation of the first direction-oriented image data comprises sequentially copying data of each of the characters to a corresponding rotational position.

Preferably, the first direction-oriented image data is formed by rotating each character of at least one lateral line of characters each oriented in the predetermined direction in a manner such that the each character is caused to be oriented in the first direction.

Preferably, rotation of the each character comprises sequentially copying component parts of the character to respective corresponding rotational positions.

Preferably, image data of the each character is data in the form of a dot matrix, and the rotation of the character is effected by rotating each divisional portion of the dot matrix having a predetermined size which corresponds to the plate-making image data.

For example, the characters include symbols and patterns.

To attain the second object, according to a second aspect of the invention, there is provided a stamp-making apparatus, comprising engraving means for engraving a stamp body having a mark provided thereon by the use of plate-making image data, first direction-oriented image data-forming means for forming first direction-oriented image data in which a plurality of component elements of the plate-making image data for the stamp body which is set in a manner such that the mark indicate a predetermined direction are each oriented in a first direction which is different from the predetermined direction, detecting means for detecting that it is difficult to discriminate orientation of the stamp body having the mark without reference to the mark, instruction signal-generating means for generating an instruction signal for instructing that second direction-oriented image data be formed in which whole of the first direction-oriented image data is oriented in a second direction, and second direction-oriented image data-forming means responsive to the instruction signal for forming the second direction-oriented image data in which the whole of the first direction-oriented image data is oriented in the second direction.

The stamp-making apparatus according to the second aspect of the invention provides the same effects as obtained by the method according to the first aspect of the invention.

Preferably, the second direction-oriented image data-forming means has rotation means for rotating the first direction-oriented image data.

More preferably, the rotation means sequentially copies data of each of the characters to a corresponding rotational position.

Further preferably, the rotating means also serves means for rotating each character of at least one lateral line of the characters each oriented in the predetermined direction in a manner such that the each character is caused to be oriented in the first direction.

According to this preferred embodiment, means for rotation of each image of laterally-written characters (i.e. characters arranged in a line or lines for reading from left to right as found in normal English-language writing) in lateral lines can be also used as means for converting the predetermined vertically-written character image data as image data of lateral lines of vertically-written characters to the vertically-arranged vertically-written character image data as image data of vertical lines of vertically-written characters extending in the second direction. Therefore, compared with a case necessitating additional means, the whole construction of the apparatus can be simplified.

Further preferably, the rotation means has copying means for sequentially copying component parts of the character to respective corresponding rotational positions.

Further preferably, the rotating means rotates each divisional portion of a dot matrix having a predetermined size which corresponds to the plate-making image data.

The above and other objects, features, and advantages of the invention will become more apparent from the following detailed description taken in conjunction with the accompanying drawings.

BRIEF DESCRIPTION OF THE DRAWINGS

FIGS. 7A and 7B are diagrams which are useful in explaining construction of a stamp body of a square stamp, in which:

FIG. 7A shows the stamp body of the square stamp in a state mounted in the pocket; and FIG. 7B shows the bottom of the stamp body of the square stamp;

FIGS. 7C and 7D are diagrams which are useful in explaining construction of a stamp body of a business stamp, in which:

FIG. 7C shows the stamp body of the business stamp in a state mounted in the pocket; and FIG. 7D shows the bottom of the stamp body of the business stamp;

FIGS. 21A1 to 21B6 are diagrams of a sequence of changes in image and simplified data matrix therefor which are useful in explaining how an image of vertically-written characters each oriented in a predetermined lateral direction is made from the image of laterally-written characters of FIG. 20A corresponding to the FIG. 20B data matrix, by the FIG. 19 processing;

FIGS. 23A1 to 23B5 are diagrams of a sequence of changes in image and data matrix which is useful in explaining the FIG. 22 processing;

FIGS. 24A1 to 24A4 and 24B2 to 24B3 are diagrams of images and data matrices which are useful in explaining a variation of the one character image data-rotating processing carried out when the size of a character is indivisible by the size of a character to be handled by rotating means set for use in advance;

FIGS. 28A1 to 28B4 are diagrams of a sequence of changes in image and simplified data matrix therefor which are useful in explaining how vertically-arranged vertically-written character data oriented in a predetermined vertical direction is made from the image of the predetermined vertically-written character image data of FIG. 26A corresponding to the FIG. 26B data matrix, by the FIG. 25 processing.

DETAILED DESCRIPTION

The invention will now be described in detail with reference to the drawings showing an embodiment thereof.

Figure 1A:
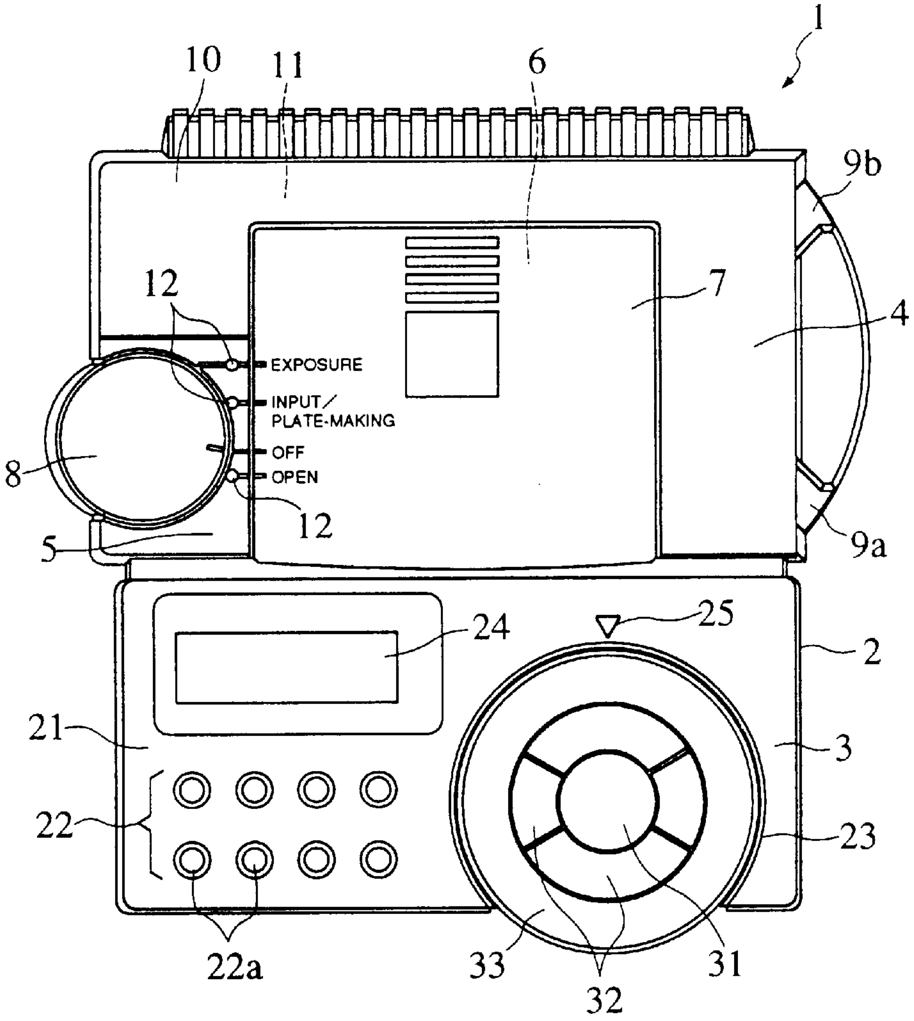
FIG. 1A is a plan view of an appearance of a stamp-making apparatus to which is applied a stamp-making method according to an embodiment of the invention.
Figure 1B:
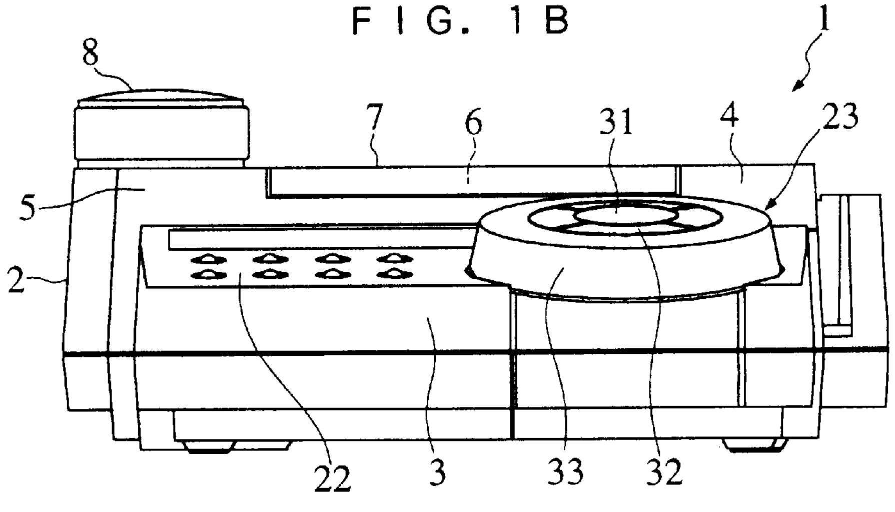
FIG. 1B is a front view showing an appearance of the stamp-making apparatus.
Figure 11:
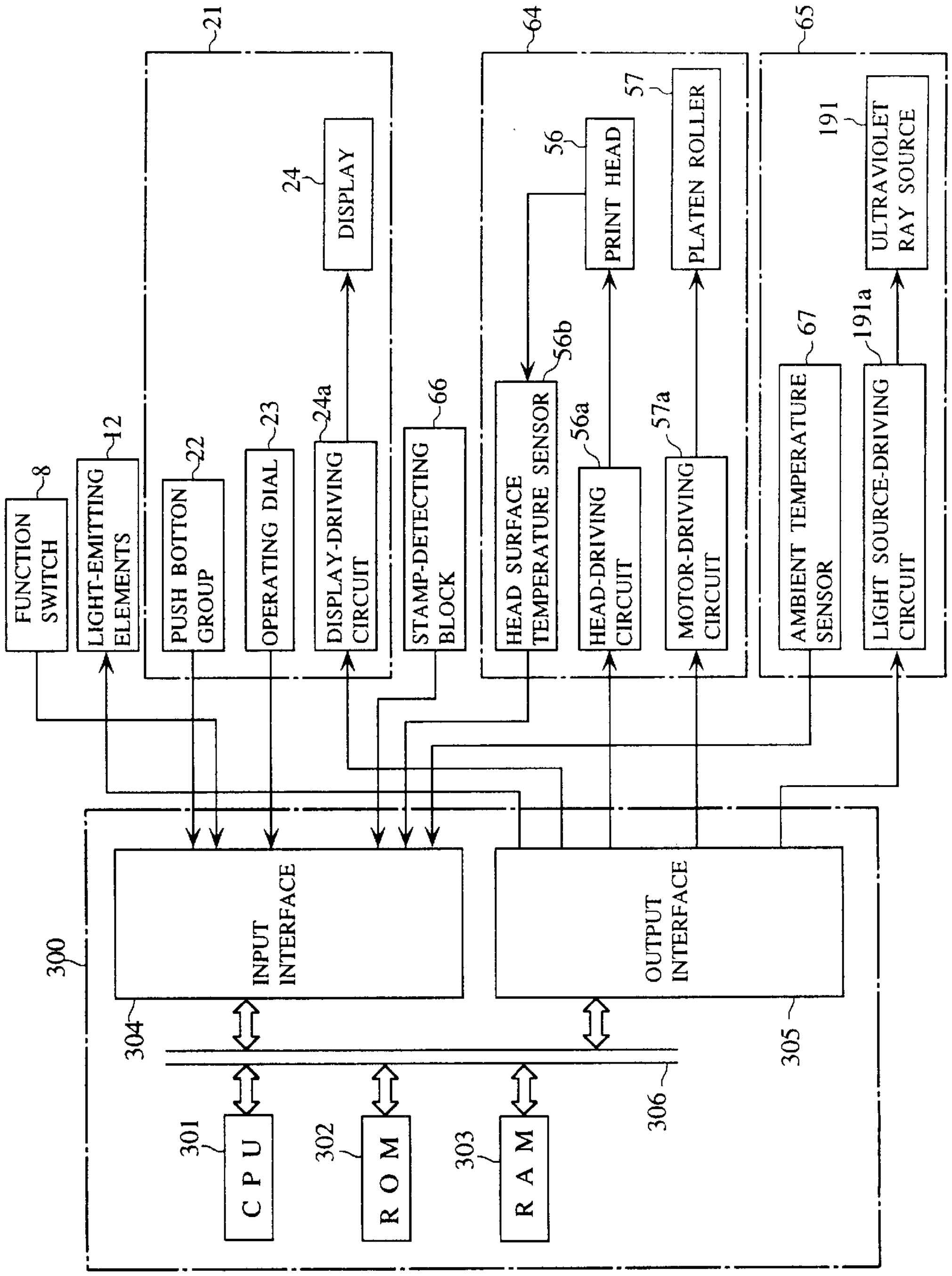
FIG. 11 is a block diagram of a control block and devices connected thereto of the stamp-making apparatus.

Referring first to FIGS. 1A and 1B, there is shown a stamp-making apparatus 1 to which is applied a stamp-making method according the embodiment of the invention. The stamp-making apparatus makes a desired stamp by exposing a stamp body having a stamp surface made of ultraviolet-curing resin to ultraviolet rays via a mask of an ink ribbon printed with a stamp image including images of characters and patterns. The stamp-making method of the invention is mainly directed to making stamp image data as information based on which a mask is formed on an ink ribbon. FIG. 1A is a plan view of the apparatus, while FIG. 1B is a front elevation of the same. FIG. 11 is a block diagram of a control system of the apparatus.

As shown in FIGS. 1A and 1B, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a pocket 6 formed in a central area of the mechanical block for receiving therein a stamp body A as a stamping-making object material to mount the stamp body A in the mechanical block body 5, and a lid 7 for opening and closing the pocket 6, which is formed with a window. In a left side portion of the mechanical block 4 as viewed in the figures, a function switch 8 is provided for switching the operation of the stamp-making apparatus 1 between plate-making (printing) and exposure, as well as for permitting the lid 7 to be opened. Information of each switching operation of the function switch 9 is sent to an input interface 304 of a control block 300, referred to hereinafter, while indications of "EXPOSURE", "INPUT/PLATE-MAKING", "OFF" and "OPEN" are provided at respective operating positions. At the operating positions of "EXPOSURE", "INPUT/PLATE-MAKING", and "OPEN", there are provided respective light-emitting elements 12 connected to an output interface 305 of the control block 300. Further, in a right side portion of the mechanical block 4, there are formed an inserting slot 9*a* for feeding a plate-making sheet B from which is made a stamp character label, referred to hereinafter, and a take-out slot 9*b* for delivering the plate-making sheet B therefrom. Further, the mechanical block 4 has a maintenance cover 10 removably mounted on part thereof outside the pocket 6, and an ink ribbon cartridge 11 carrying an ink ribbon C is mounted under the maintenance cover 10.

The electronic block 3 has an operating block 21 formed on the top thereof and contains the control block 300 therein. The operating block 21 includes a push button group 22 and an operating dial 23 both connected to the input interface 304 of the control block 300, and an indicator-driving circuit (see FIG. 11) connected to the output interface 305 of the control block 300 and an indicator 24 driven by the indicator-driving circuit 24*a*. The operating dial 23 has a trial structure of an execution key 31 having a circular shape and arranged in the center, a cursor/conversion key 32 having four divisional blocks arranged along the outer periphery of the execution key 31 to form an annular shape, and a character input key 33 having an annular shape and arranged along the outer periphery of the cursor/conversion key 32. On the surface of the character input key 33, hirakana characters representative of the Japanese syllabary, not shown, etc. are printed. The inputting of stamp characters is carried out by first setting a character size by pushing a predetermined button 22*a* of the push button group 22, turning the character input key 33 to set each of desired hirakana characters to a triangle mark 25, and pushing the execution key 31 whenever each of the desired hirakana characters is set to the triangle mark 25, followed by converting desired ones of the input hirakana characters to kanji characters by operating the cursor/conversion key 32. When desired stamp characters are formed on the display 24, they are settled.

Figure 2:
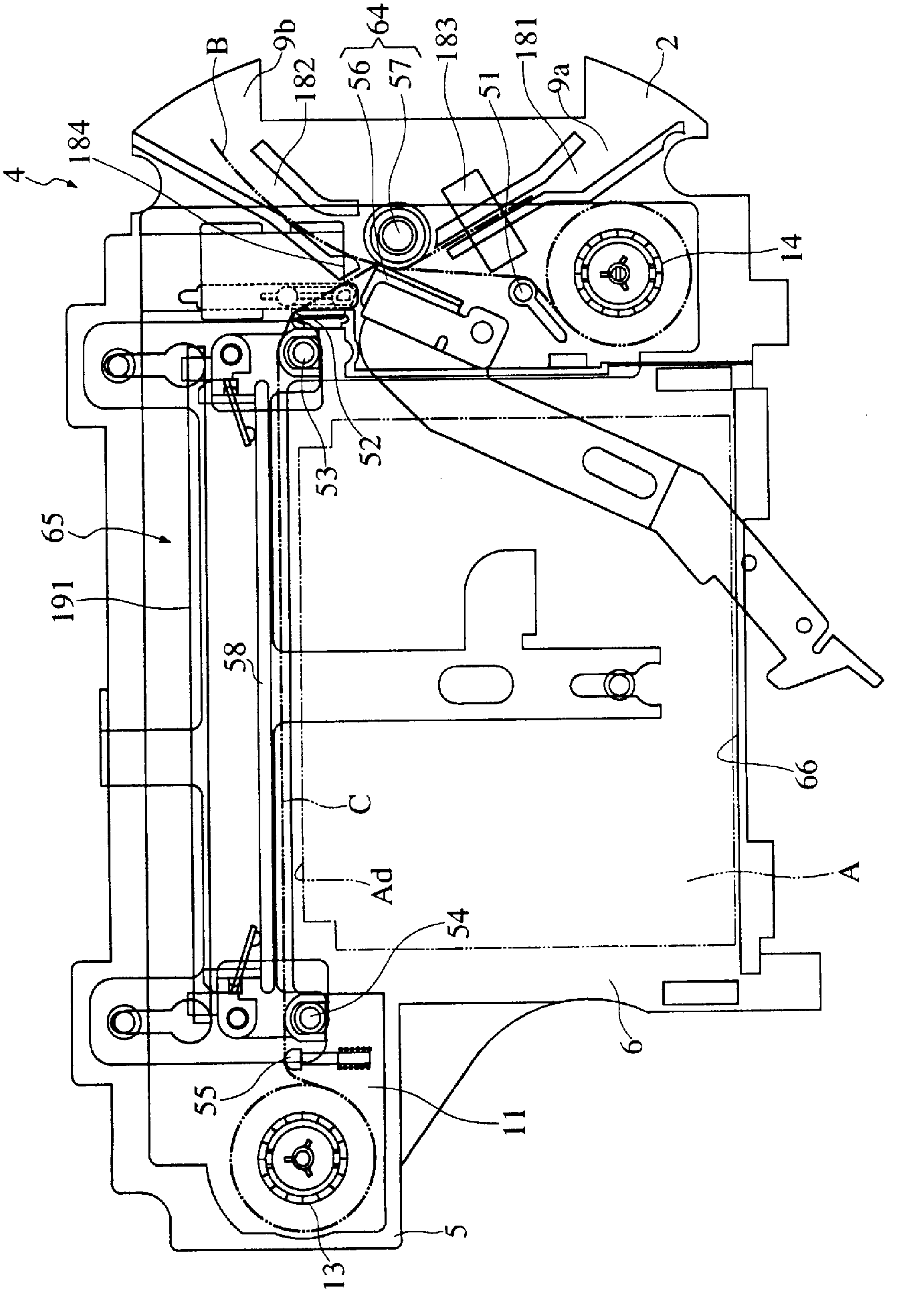
FIG. 2 is a plan view of an internal construction of a mechanical block of the stamp-making apparatus.

Now, a sequence of operations for making a stamp will be briefly described with reference to FIGS. 1A and 1B, and 2. First, the function switch 8 is rotated from "OFF" position as a standby position to "OPEN" position to open the lid 7, and a stamp body A is set in the pocket 6. As the stamp body A is set, the type of the stamp body A is detected by a stamp-detecting block 66 connected to the input interface 304 of the control block 300.

Then, the function switch 8 is rotated to "INPUT/PLATE-MAKING POSITION" to shift the function of the apparatus to plate-making, and the push button group 22 and the operating dial 23 are operated to input stamp characters. When the inputting of stamp characters is completed, the plate-making sheet B on which a stamp character label is provided is set by inserting the same into the inserting slot 9*a*.

Then, a predetermined button 22*a* of the push button group 22 is operated to cause the apparatus to execute the plate-making operation, i.e. printing of the stamp characters. The printing is effected simultaneously on the ink ribbon C and the plate-making sheet B. When the printing is completed, the ink ribbon (printed portion thereof) C is fed or advanced to set the same for exposure to ultraviolet rays, and at the same time plate-making sheet B is discharged from the take-out slot 9*b*. When it is confirmed by the plate-making sheet B discharged that there is no error in the printed stamp characters, the function switch 8 is rotated to the "EXPOSURE" position to shift the function of the apparatus to exposure, thereby causing an exposure block 65, referred to hereinafter, to perform exposure of the stamp body to ultraviolet rays.

When the exposure to ultraviolet rays is completed, the function switch 8 is rotated to the "OPEN" position to open the lid 7, and then the stamp body A is removed from the pocket 6 to wash the same. The washing completes the stamp. Before or after completion of the stamp, the stamp character label is peeled off the plate-making sheet B to attach the same on the back of the stamp.

Next, out of the component parts and elements of the stamp-making apparatus 1, ones associated with the control block 300, described in detail hereinafter, will be described with reference to FIGS. 2 to 11, one by one.

The ribbon cartridge 11 is constructed such that it is removable from the mechanical block body 5, and it is replaceable together with a casing thereof when the ink ribbon C is used up. As shown in FIG. 2, the ribbon cartridge 11 has a take-up reel 13 arranged at one end thereof and a supply reel 14 arranged at the other end thereof. The ink ribbon C is rolled out from the supply reel 14, fed along a feed path in the form of a rotation of an inverted-L shape as viewed in FIG. 2, and taken up by the take-up reel 13. The feed path in the form of a rotation of an inverted-L shape has a shorter side portion which a printing block 64, referred to hereinafter, faces and a longer side portion which the exposure block 65, referred to hereinafter, faces. The printing block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated thereon. In the present embodiment, it has a thickness of 6 $\mu$m. When the printing block 64 of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The ink ribbon C is sent forward to the exposure block 65 to use the resulting negative image-formed portion thereof as a mask in carrying out the exposure, while the plate-making sheet B is delivered from the apparatus for confirmation of the stamp characters and affixing the same to the stamp thus made.

Figure 4:
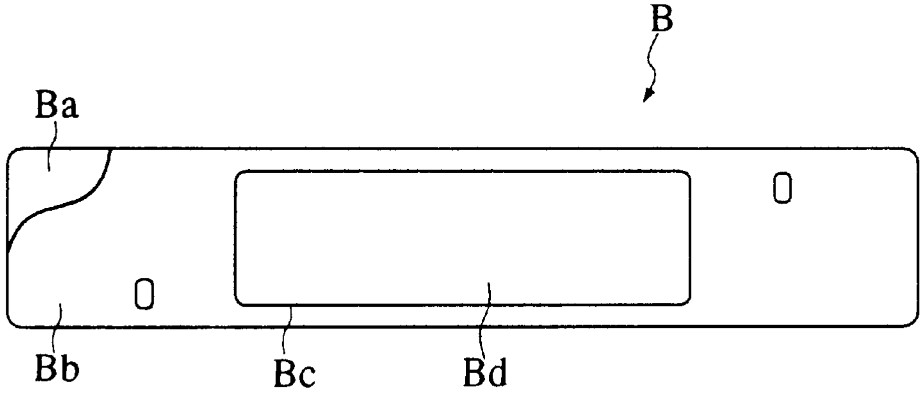
FIG. 4 is a view showing a structure of a plate-making sheet.

As shown in FIG. 4, the plate-making sheet B is a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled off the base sheet Ba along the cutting lines Bc to form the stamp character label Bd to be affixed to the back of the stamp. There are provided several types of the stamp body A which are different in shape from each other according to the use of stamps, and there are also provided respective corresponding types of the plate-making sheet which are different in the shape of an area of the stamp character label Bd (shape and size of an area defined by cutting lines).

Figure 3:
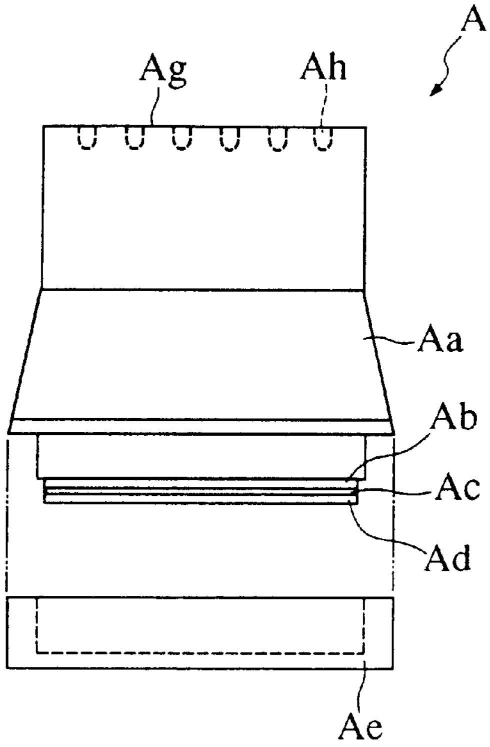
FIG. 3 is a view showing a structure of a stamp body.

On the other hand, as shown in FIG. 3, the stamp body A is comprised of a stock Aa (formed of a resin in the present embodiment), a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamp surface Ad. The ultraviolet-curing resin portion (stamp surface Ad) of the stamp body A is exposed to ultraviolet rays with the ink ribbon C as a mask, whereby portions of the stamp surface Ad corresponding to the stamp characters are cured. In this state, the stamp body A is taken out of the pocket 6, and washed with water to remove uncured portions of the stamp surface, which are soluble in water, from the stamp surface Ad. Thus the stamp is completed. Symbol Ae in the figure designates a cap made of resin.

Next, the printing block 64 will be described with reference to FIGS. 2 and 11. The printing block 64 includes a head-driving circuit 56*a* and a motor-driving circuit 57*a* both of which are connected to the output interface 305 of the control block 300, the print head (thermal head) 56 driven by the head-driving circuit 56*a* for printing stamp characters on the ink ribbon C, a platen roller 57 for feeding the ink ribbon C in a manner timed to printing operations of the print head 56, and a head temperature sensor 56*b* arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 is formed with the inserting slot 9*a* which is open to the outside of the apparatus, at an upstream end thereof, and the delivery passage 182 is formed with the take-out slot 9*b* which is open to the outside of the apparatus, at a downstream end thereof.

The platen roller 57 is a drive roller as described hereinabove, and when the ink ribbon C is rolled out from the supply reel 14, it pulls in the plate-making sheet B between the print head 56 and itself to thereby bring a portion of the ink ribbon C and a portion of the plate-making sheet B, one upon the other, onto the print head 56. The print head 56 is a thermal head, and thermally transfer ink coated on the ribbon tape of the ink ribbon C to the plate-making sheet B. This transfer of the ink peels portions of ink corresponding to stamp characters off the ink ribbon C to reveal corresponding portions of the transparent base of the ribbon tape, while the peeled portions of the ink are attached to the plate-making sheet B as the stamp characters. The head surface temperature sensor 56*b* is formed by a temperature sensor, such as a thermistor, arranged on a surface of the print head 56 in an intimately contacting manner, and connected to the input interface 304 of the control block 300 for sending information of a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of walls defining the delivery passage 182 on a left-hand side as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block, while the plate-making sheet B is delivered via the delivery passage 182 out of the apparatus.

Next, the exposure block 65 provided will be described with reference to FIGS. 2 and 11. The exposure block 65 includes a light source-driving circuit 191*a* connected to the output interface 305 of the control block 300, an ultraviolet ray source 191 arranged in a manner opposed to the stamp surface Ad of the stamp body A set in the pocket 6 and driven by the light source-driving circuit 191*a,* and a presser plate 58 arranged between the ultraviolet ray source 191 and the stamp surface Ad of the stamp body A. The ultraviolet ray source 191 is a self-heating hot-cathode tube called a semi-hot tube and supported on a fluorescent tube holder, not shown, provided on a base plate, not shown. The stamp surface Ad of the stamp body A, the presser plate 58, and the ultraviolet ray source 191 are arranged in a manner parallel to each other with a gap between adjacent ones thereof. The ink ribbon C is fed between the stamp surface Ad and the presser plate 58.

The presser plate 58 is formed e.g. of a transparent resin, and moves forward (downward as viewed in FIG. 2) to urge the ink ribbon C against the stamp surface Ad of the stamp body A. More specifically, the exposure is carried out by causing the presser plate 58 to urge the ink ribbon C against the stamp surface Ad of the stamp body A, and lighting the ultraviolet ray source 191 to thereby irradiatie light to the ink ribbon C through the presser plate 58 (see FIG. 5). The exposure block 65 is provided with an ambient temperature sensor 67 which is connected to the input interface 304 of the control block 300, and sends information of a temperature of ambience of the exposure block 65 detected thereby to the input interface 304.

It should be noted that as the presser plate 58 is translated forward, the first guide pin 53 and the second guide pin 54 are moved in the same direction. This movement decreases the tension of the ink ribbon C stretched between the first and second guide pins 53, 54, whereby the ink ribbon C is urged against the stamp surface Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamp surface Ad of the stamp body A as it is, there remain the wrinkles formed on the ink ribbon C urged against the stamp surface Ad, so that deformed images (negative) of the stamp characters on the ink ribbon C are used in carrying out the exposure of the stamp surface Ad to the ultraviolet rays. On the other hand, if the ink ribbon C is loosened, the exposure can be carried out with the images of the stamp characters being out of position. To eliminate these inconveniences, as shown in FIG. 5, the first guide pin 53 and the second guide pin 54 are moved forward in accordance with the forward movement of the presser plate 58, whereby the tension of the ink ribbon C is reduced, and at -the same time, a slight stretching force is applied to the ink ribbon C by the tension pin 55, which is moderate enough not to produce any wrinkles on the ink ribbon C.

Figure 5:
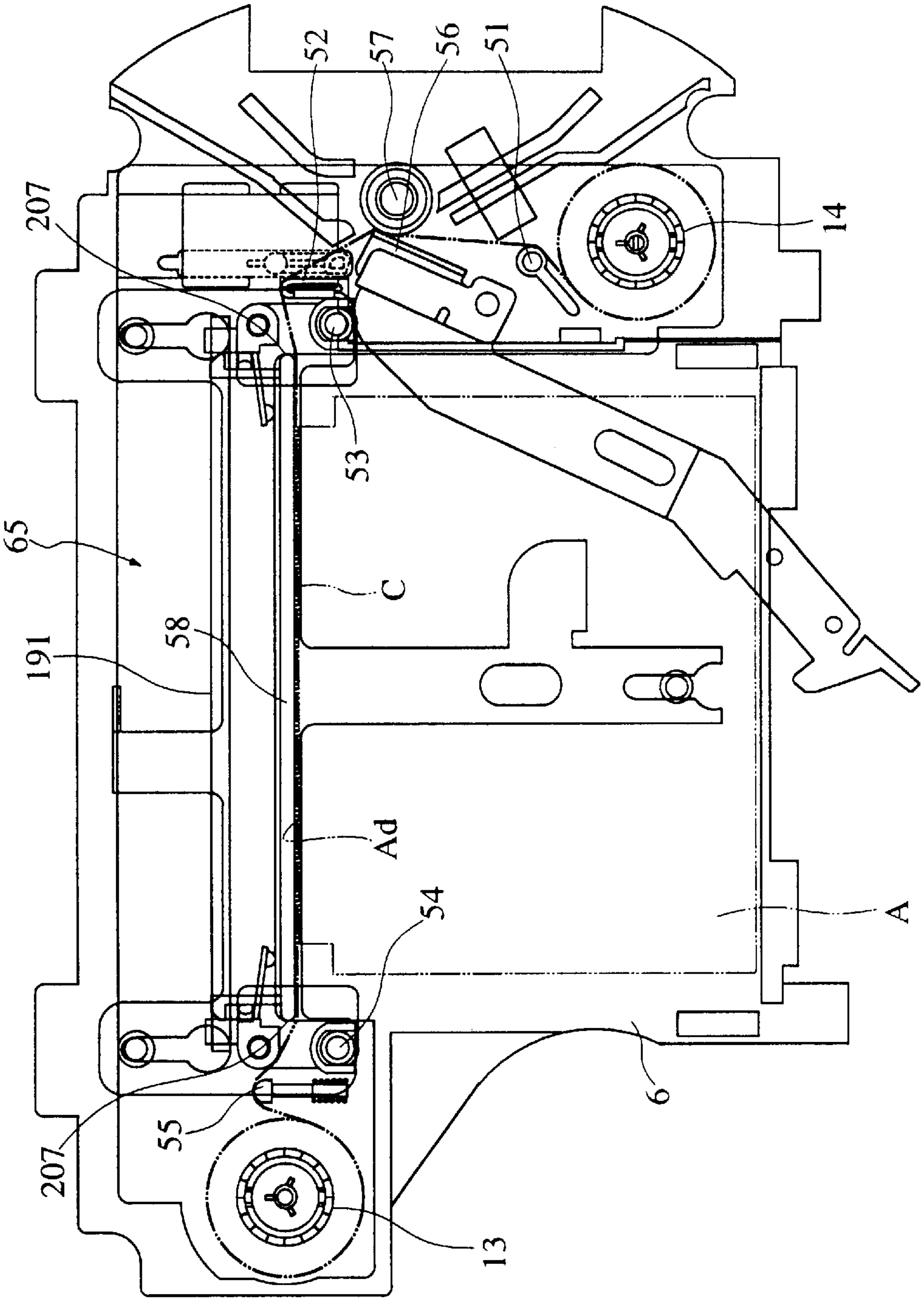
FIG. 5 is a plan view of an exposure system of the mechanical block and component parts associated therewith.
Figure 6:
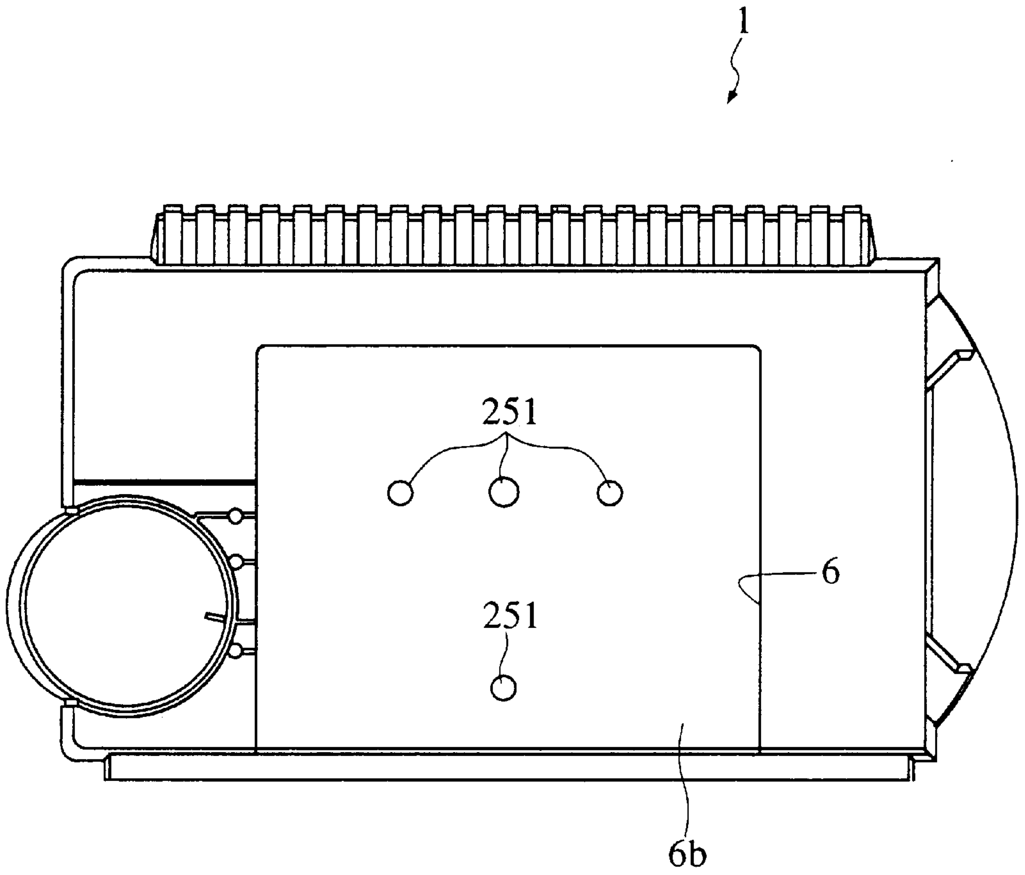
FIG. 6 is a plan view showing a pocket formed in the mechanical block with a lid removed therefrom.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, images of deformed characters are formed on the stamp body by the exposure. To eliminate this inconvenience, in addition to mechanical structural means for regulating the tension of the ink ribbon described above, electrical means of adjusting an amount of heat generated by the exposure process is provided to thereby preventing undesired wrinkles from being formed on the ink ribbon C.

Next, the stamp-detecting block 66, the operation of which is linked to the opening and closing of the lid 7, will be described. The stamp-detecting block 66 detects the mounting of the stamp body A in the pocket 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length, but different in width and thickness. It should be noted that the above "length" means a size of the stamp body A between the stamp surface Ad and a surface on an opposite side thereto (back surface Ag), the above "width" means a size of the stamp body A between surfaces of opposite lateral ends thereof in its position mounted in the pocket 6, and the above "thickness" means a size of the stamp body between an upper side surface and a lower side surface of the stamp body in its position mounted in the pocket 6. To set each of these various types of the stamp body A different in width and thickness to a fixed position with respect to the directions along the width and the thickness of the stamp body A, in the present embodiment, as shown in FIGS. 6 and 7A to 7D, four bosses 251, 251, 251, 251, long and short, are provided on the bottom 6*b* of the pocket 6 such that they extend perpendicularly upward from the bottom, and the stamp body A is formed with fitting holes Af for fitting corresponding ones of the bosses therein, respectively, (see FIG. 7A to 7D).

Figure 7A:
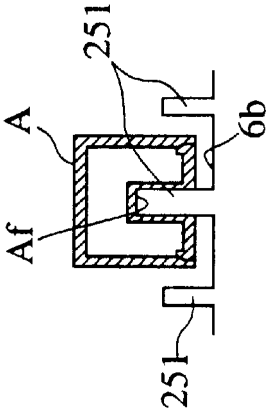
Figure 7B:
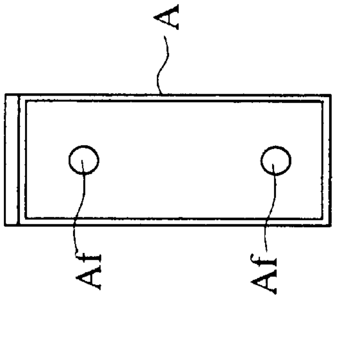
Figure 7C:
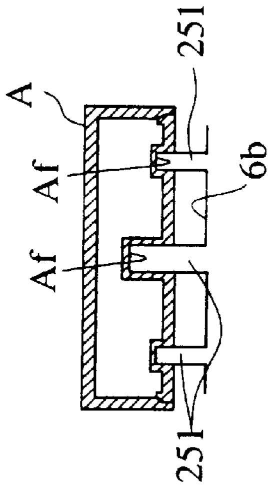
Figure 7D:
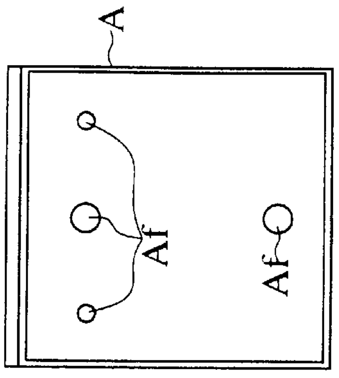
Figure 8A:
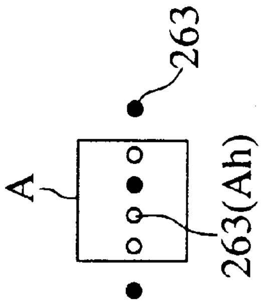
FIG. 8A is a diagram showing a pattern for discriminating a stamp body of a small square stamp.
Figure 8B:
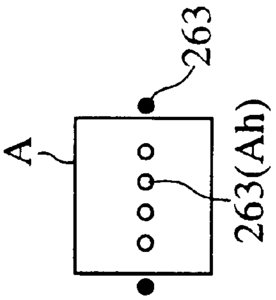
FIG. 8B is a diagram showing a pattern for discriminating a stamp body of a large square stamp.
Figure 8C:
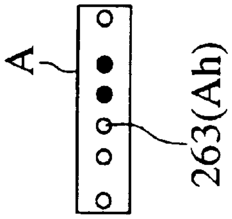
FIG. 8C is a diagram showing a pattern for discriminating a stamp body of a personal name stamp.
Figure 8D:
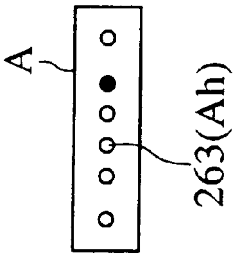
FIG. 8D is a diagram showing a pattern for discriminating a stamp body of a small business stamp.
Figure 8E:
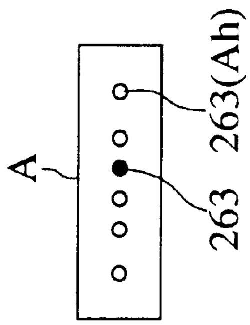
FIG. 8E is a diagram showing a pattern for discriminating a stamp body of a large business stamp.
Figure 8F:
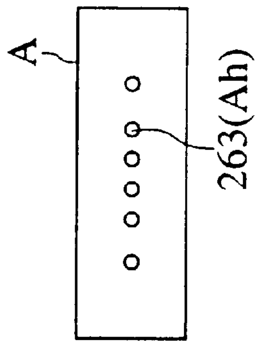
FIG. 8F is a diagram showing a pattern for discriminating a stamp body of an address stamp.
Figure 8G:
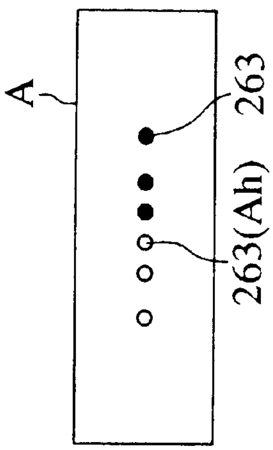
FIG. 8G is a diagram showing a pattern for discriminating a maximum size stamp body.

The four bosses 251, 251, 251, 251 are arranged to form a T shape, and in a manner corresponding thereto, a stamp body A for the square stamp, for example, is formed with two fitting holes Af, Af (see FIGS. 7A and 7B), and a stamp body A for the business stamp, for example, is formed with four fitting holes Af, Af, Af, Af (see FIGS. 7C and 7D). The number of the fitting holes Af and the depth of each of them depend on the type of the stamp body A, and this combination of the fitting holes Ag and the bosses 251 enables each stamp body A to be mounted in the pocket 6 such that the center of the stamp surface Ad of the stamp body A mounted in the pocket 6 is positioned to a fixed location.

Further, the back surface Ag on the opposite side to the stamp surface Ad is formed with a plurality of small holes Ah (type-detecting holes) arranged side by side at respective central locations along the width of the stamp body A. The small holes Ah cooperate with a switch array 262 of the stamp-detecting block 66, described hereinafter, to detect the type of the stamp body A (see FIGS. 8A to 8G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 9:
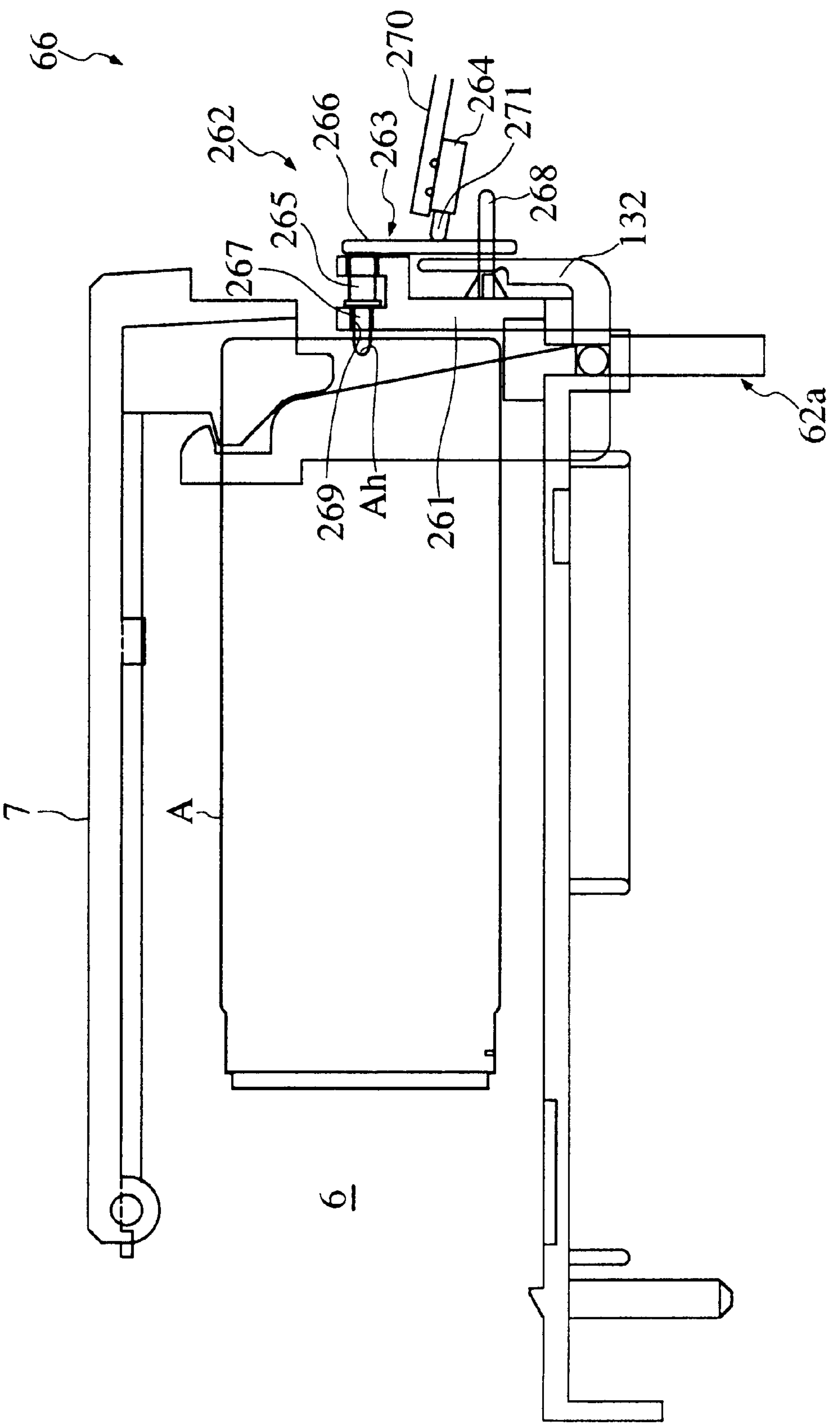
FIG. 9 is a cross-sectional view which is useful in explaining operations of a stamp-detecting block for detecting a stamp body.
Figure 10:
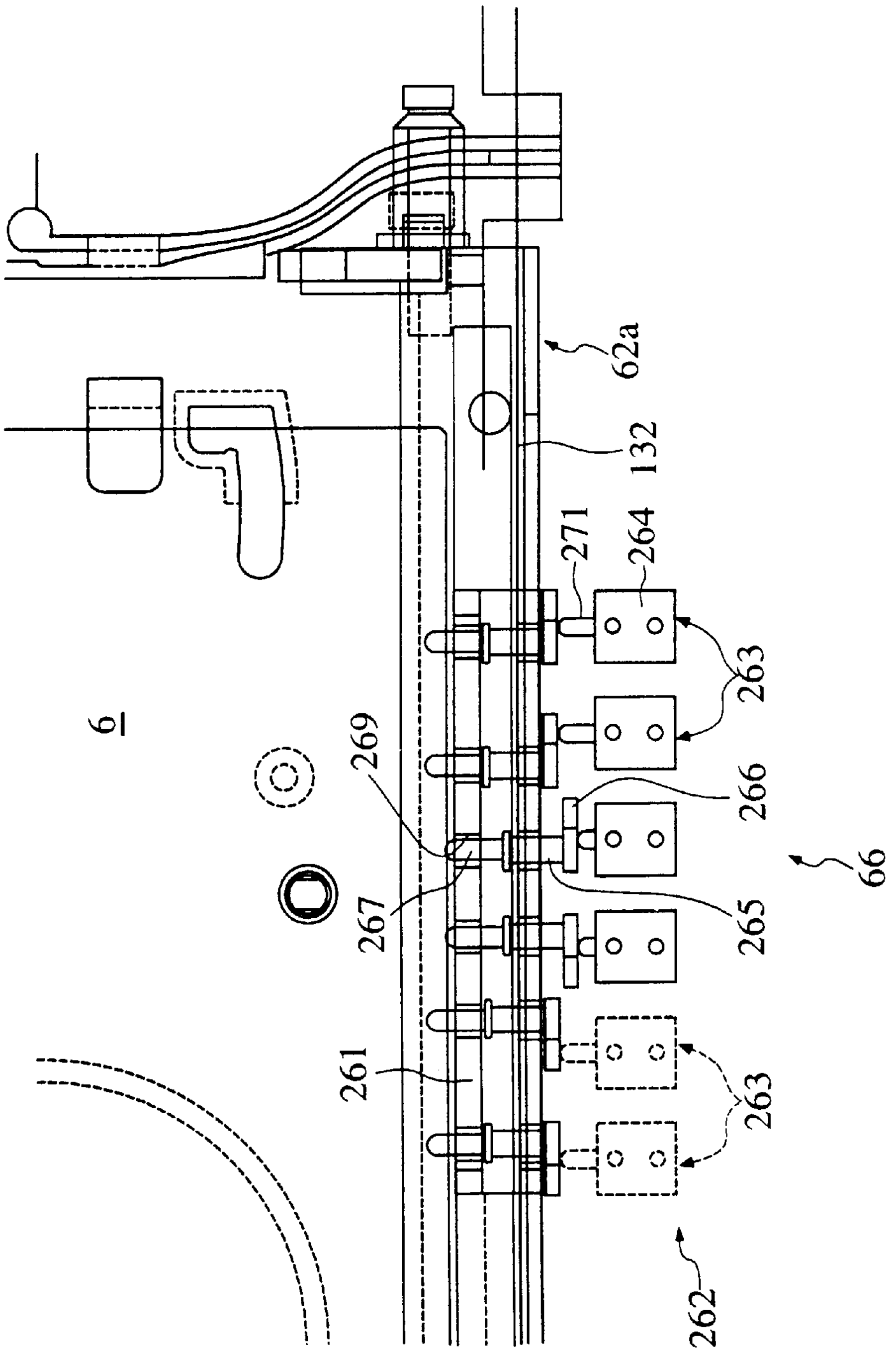
FIG. 10 is a partial plan view showing the pocket, the stamp-detecting block, and component parts associated therewith.

As shown in FIGS. 9 and 10, the stamp-detecting block 66 includes a switch holder 261 (also serving as a wall of the pocket 6) arranged such that it is opposed to the back surface Ag of the stamp body A when it is mounted in the pocket 6, and the switch array 262 formed of six detecting switches 263 supported on the switch holder 261. Each detecting switch 263 is comprised of a switch body 264 formed e.g. of a push switch, and a switch top 265 having one end for being projected into the pocket 6. The switch top 265 includes a plate portion 266 and a detecting projection 267 (including the one end) extending at a right angle to the plate portion 266, with a lower part of the plate portion 266 being guided by a guide projection 268 formed in the switch holder 261 and the detecting projection 267 being guided by a guide hole 269 formed through the switch holder 261 for forward and backward motions thereof.

The switch body 264 is fixed to the reverse side surface of a base plate 270 such that a plunger 271 thereof abuts the plate portion 266 of the switch top 265. The plunger 271 urges the switch top 265 toward the pocket 6 by the urging force generated by its spring, not shown. A state of the one end of the detecting projection 267 projected into the pocket 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, mounting of the stamp body A is detected, whereas when all of the detecting switches 263 are turned off, removal of the stamp body A is detected. The detecting switches 263 of the switch array 262 are each in ON or OFF state depending on whether a corresponding small hole Ah exists in the stamp body A. Therefore, the type of the stamp body A can be determined from a pattern of ON/OFF states of the six detecting switches 263.

FIGS. 8A to 8G show the relationship between small holes Ah in the stamp body A and the six detecting switches 263 (detecting projections 267). Provision of the six detecting switches 263 for detecting presence or absence of the small holes Ah makes it possible to detect $2^n-1$ (n=6), i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is formed e.g. by a microcomputer, and includes a CPU 301, a ROM 302, an input interface 304, an output interface 305, and a system bus 306 connecting all these devices to each other.

The ROM 302 stores various programs, dictionary data for kana-kanji character conversion, font data of characters, symbols, etc. and fixed data, such as data of a predetermined stamp frame. The RAM 303 is used as a working area, and also as means for storing fixed data input by a user. The data stored in the RAM 303 is backed-up even when the power is turned off.

The input interface 304 interfaces to take in signals from the function switch 8, the push button group 22 and the operating dial 23 of the operating block 21, the head surface temperature sensor 56*b* of the printing block 64, the ambient temperature sensor 67 of the exposure block 65, and the stamp-detecting block 66, via the system bus 306 into the CPU 301 or the RAM. The output interface 305 interfaces to deliver control signals and data used in control operations received via the system bus 306 from the CPU 301, the ROM 302, and the RAM 303 to the light-emitting elements 12, the display-driving circuit 24*a* of the operating block 21, the head-driving circuit 56*a* of the printing block 64, the motor-driving circuit 57*a*, the light source-driving circuit 191*a* of the exposure block 65, etc.

The CPU 301 carries out processing based on input signals from the input interface 304, and a processing program stored within the ROM 302 and selected according to the processing on each occasion, using the RAM 303 as the working area, and fixed data stored within the ROM 302 and the RAM 303, as needed.

Figure 12:
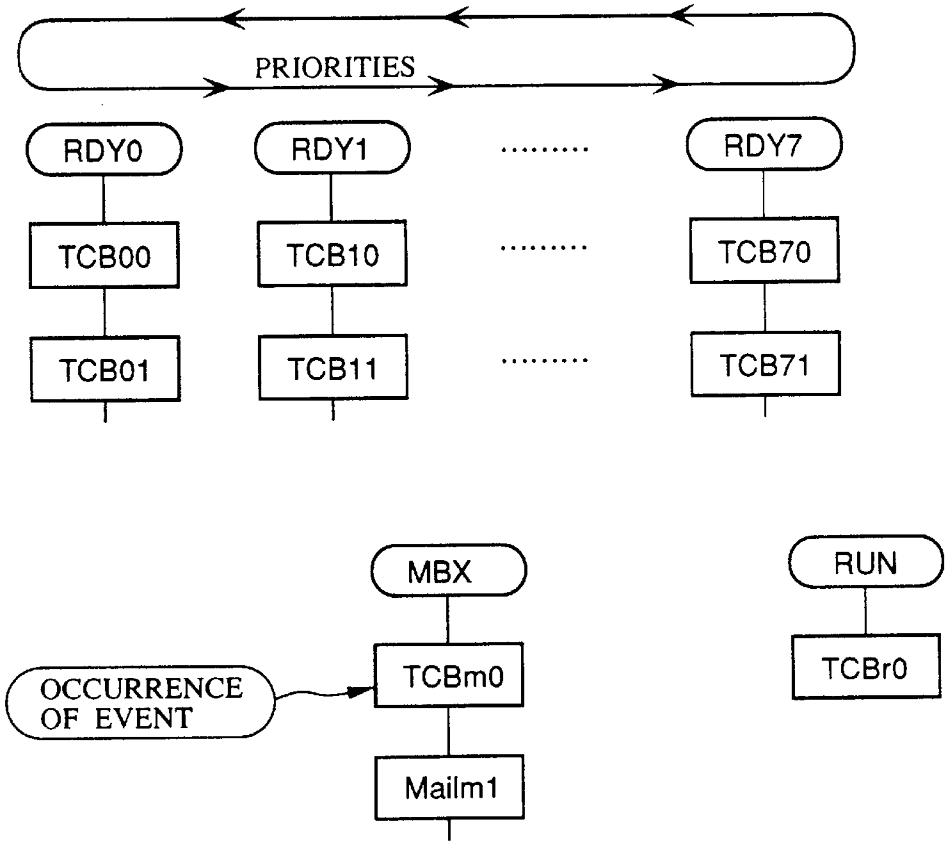
FIG. 12 is a conceptual representation of an outline of multitasking by the stamp-making apparatus.

The stamp-making apparatus 1 of the present embodiment carries out multitask processing in the following manner:

FIG. 12 shows a conceptual representation of the multitasking of the present embodiment. A plurality of tasks to be executed are classified into groups having respective priorities RDY0 to RDYn (in the case of the illustrated example, n=7), and the order of processing of tasks is determined based on the priorities to thereby activates each task. In the following description, tasks assigned the highest priority RDY0 are designated as TCB0i (i=0, 1, 2, . . . ), and tasks assigned the lowest priority are designated as TCB7*i*. In general, a task assigned the priority RDYj (j=0 to 7) is designated as TCBji. Further, when a task is classified into a group having the priority RDYj, and placed in a wait state in this group, i.e. in the priority, this state will be described e.g. as "a task TCBm0 is registered as TCBj0". When one or more tasks assigned the priority RDYj are registered, it will be expressed as "task existing in RDYj".

Further, as shown in FIG. 12, in the multitasking, an area is set aside for registering a name of each task (e.g. TCBm0 shown in the figure) created for execution in response to an event, such as an interrupt, generated e.g. by depression of any of the push buttons of the push button group 22 or operation of the operating dial 23, and registering a communication task between tasks (e.g. Mailm1 shown in the figure; hereinafter simply referred to as a "mail"). This area will be referred to as "mail box MBX" in the following description. Further, the name of a task representative of the contents of current or actual processing is expressed as TCBr0, and execution of this task for processing is expressed as "the active task run processing", or "the RUN processing" in an abbreviated form. For example, when a task TCB00 is selected and activated, it will be expressed as "the task TCB00 is registered as TCBr0 and activated". This registration is shown as "TCBr0<TCB00" in hierarchical operation diagrams, referred to hereinafter, and flowcharts. The task TCBm0 in the mailbox MBX contains information concerning whether the task TCBr0 currently being executed should be forcedly interrupted or not, and which priority RDYi it should be registered in, and in MBX processing, referred to hereinafter, the task TCBm0 is executed according to these pieces of information.

Figure 13:
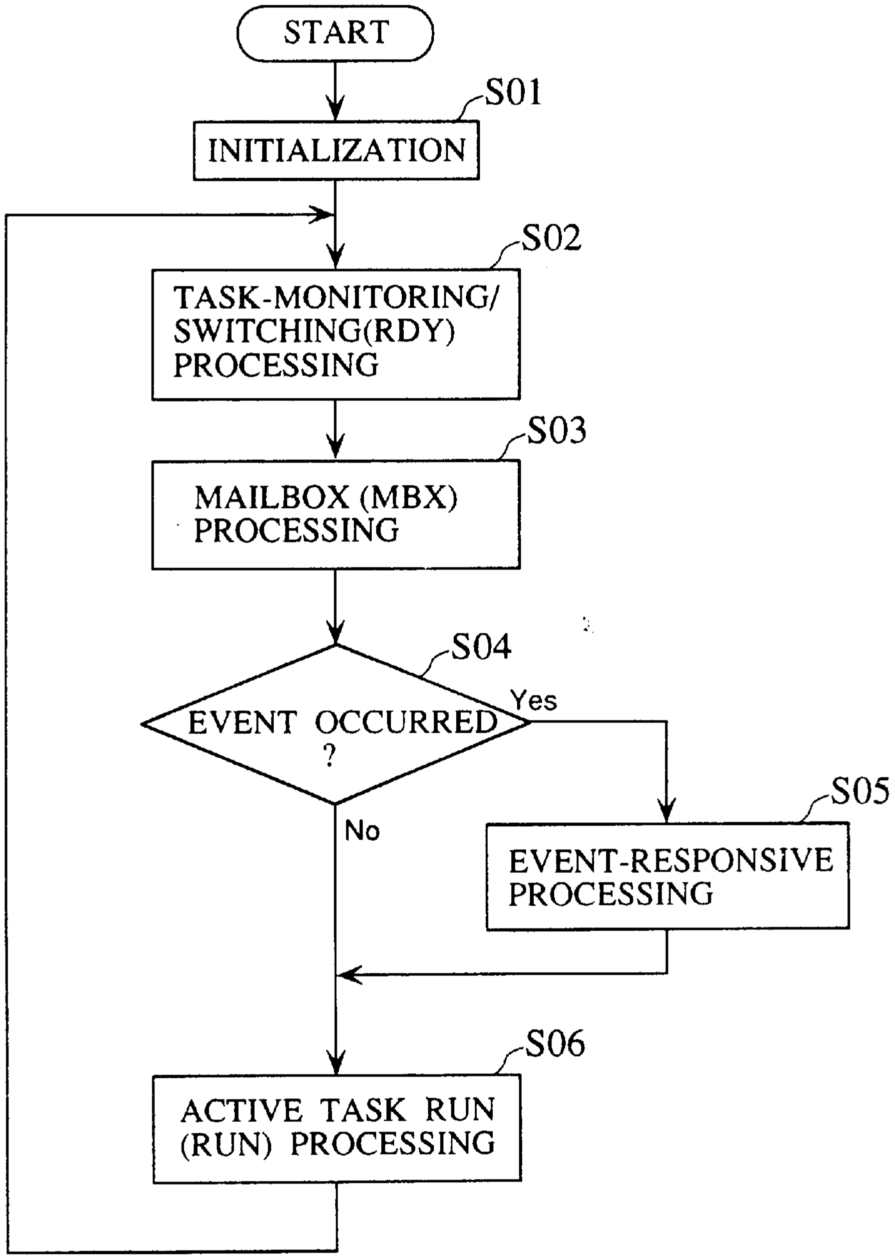
FIG. 13 is a flowchart showing an outline of the overall processing of the stamp-making apparatus.

FIG. 13 shows a procedure of processing executed according to the stamp-making method of the present embodiment, expressed in the form of an ordinary flowchart. As shown in the figure, when the power is turned on to start the processing, first an initialization of each device of the stamp-making apparatus is executed at a step S01, task-monitoring/switching (RDY) processing at a step S02, and mailbox (MBX) processing at a step S03. Then, it is determined at a step S04 whether or not any event has occurred. If an event has occurred, event-responsive processing is executed at a step S05, and thereafter, the active task run (RUN) processing is executed at a step S06. Then, the RDY processing (the step S02) to the RUN processing (the step S06) are repeatedly executed.

However, in the actual processing, the RDY processing and the MBX processing are executed only at predetermined regular timing, but event-responsive processing is started upon occurrence of the event, while the RUN processing is executed during execution of the other processing. Therefore, the present multitasking cannot be expressed accurate enough by the above flowchart, and the hierarchical structure of the program is difficult to understand therefrom. Therefore, in the following description, when a sequence of steps of a task is described, a flowchart is employed which shows a task actually executed by activating another task for the multitasking is shown as a subroutine. Event-driven type tasks, i.e. tasks which are initiated or activated in response to respective events, are described by a description method used in a diagram of FIG. 14 (hereinafter referred to as "the hierarchical operation diagram").

Figure 14:
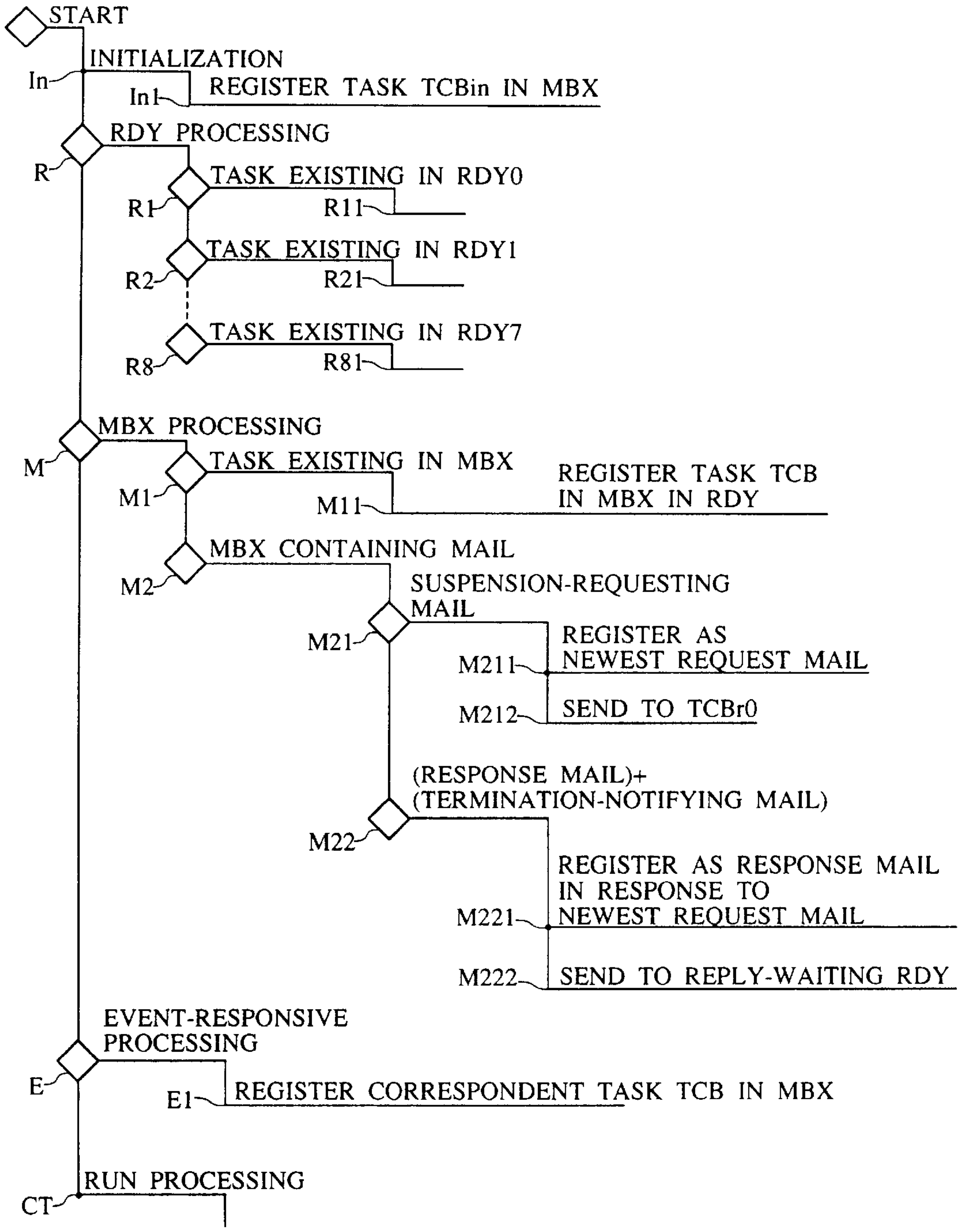
FIG. 14 is a hierarchical operation diagram showing main tasks carried out by the stamp-making apparatus.

In the hierarchical operation diagram, each processing branch point designated by symbol ◇ shows a task, a program, or a subroutine, which is of an event-driven type i.e. executed when an event, such as an interrupt or activation of a task by another task, has occurred. The task-monitoring/switching (RDY) processing shown in FIG. 14 is started only when an interrupt is generated at regular time intervals e.g. through a real time monitoring. Further, the mailbox (MBX) processing is also started by an interrupt generated at regular time intervals other than the regular time intervals of the PDY processing. The event-responsive processing registers various events, such as tasks initiated by operations of the operating dial 23, in the mailbox MBX. Although only one routine is shown in FIG. 14 as a representative, actually, the mailbox MBX is accessed for registration of the name of a task to be executed in response to each event independently whenever the event occurs.

As shown in FIG. 14, when the program is started by turning on the power, first, the initialization at a processing branch point In (hereinafter referred to as "the initialization (In)") is executed. The initialization (In) registers a task TCBin of main tasks-starting processing in the mailbox MBX (In1). When the initialization (In) is terminated, if it is neither time for the RDY processing nor time for the MBX processing, or any other event has not occurred; then the program proceeds to the RUN processing (CT). However, at this time point of the present case, there is no task registered, so that time for starting the RDY processing or the MBX processing is awaited.

In this state, when it becomes time for the RDY processing, the RDY processing (R) is executed, but there are no tasks registered in the priorities RDY0 to RDY7, i.e. no tasks exist in the priorities RDY0 to RDY7 (R1 to R8), so that the RDY processing is terminated without executing any specific processing. On the other hand, when it is time for the MBX processing, the MBX processing (M) is executed, and according to the task TCBin for starting main tasks, which has been registered as TCBm0 in the mailbox MBX, the processing of "task existing in MBX (M1)" is executed to register the task TCB of the mailbox MBX in the priority RDY. That is, if the priority specified for the task TCBin corresponds to the priority RDY4, the task TCBin is registered as TCB40 in the priority RDY4.

Figure 15:
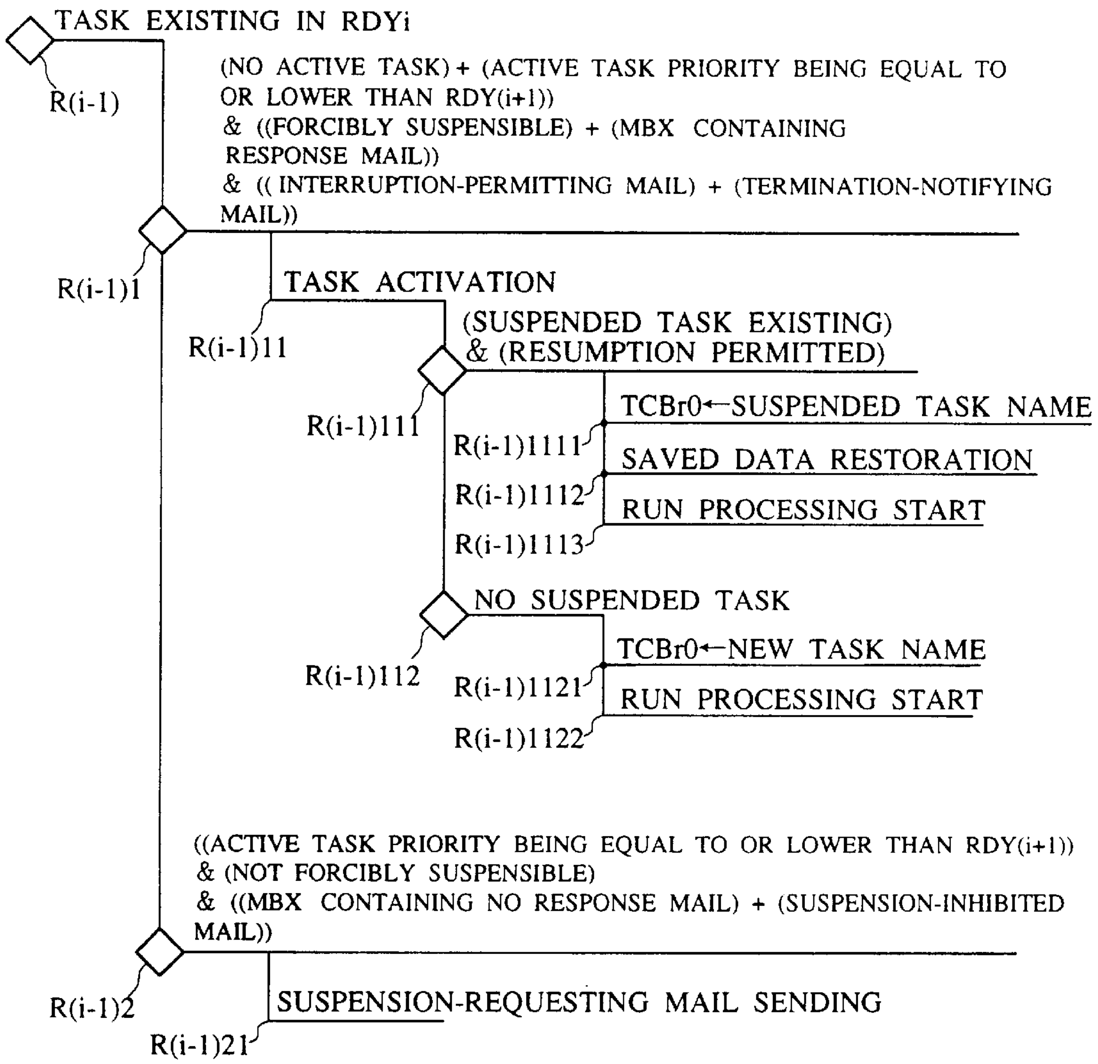
FIG. 15 is a hierarchical operation diagram of task-monitoring/switching processing executed by the stamp-making apparatus.

In this state, when it is time for the RDY processing, the RDY processing (R), e.g. the processing of "task existing in RDY4 (R3)" is executed. Now, the processing of "task existing in RDYi (R(i−1))" will be described with reference to FIG. 15. This processing largely branches into a case of activating a new task (or a suspended task), a case of sending a suspension-requesting mail to the active task, a case of executing no processing.

First, if there is no active task, i.e. if there is no task registered as TCBr0, and hence the RUN processing is not being executed, or if the active task TCBr0 has a priority equal to or lower than the priority RDY(i+1), and at the same time, the active task is suspensible, another task is stated.

The term "suspensible" means that the task to be activated can forcibly interrupt execution of the active task, or that a response mail in response to the suspension-requesting mail is an interruption-permitting mail or a termination-notifying mail indicative of termination of the active task. Under the above-mentioned condition, i.e. when the conditions of (no active task)+(active task priority being equal to or lower than RDY(i+1) & ((forcibly suspensible)+(MBX containing response mail) & ((interruption-permitting mail)+(termination-notifying mail)) are fulfilled at R(i−1)1, the new task starts to be activated at R(i−1)11. Here, "+" represents a logical sum, while "&" a logical product.

On the other hand, a suspension-requesting mail is sent to the mailbox MBX, if the priority of the active task is equal to or lower than RDY(i+1), and at the same time there is no response mail from the active task so that it is not known whether the active task is suspensible or not, or the situation requires resending of the suspension-requesting mail after a response mail saying that the active task is not suspensible was received in response to the preceding suspension-requesting mail. That is, if the conditions of (active task priority being equal to or lower than RDY(i+1) & (not forcibly suspensible) & ((MBX containing no response mail)+(suspension-inhibited mail)) are fulfilled at R(i−1)2, a suspension-requesting mail is sent at R(i−1)21. If neither of the above two sets of conditions are fulfilled, i.e. if the active task priority is equal to or higher than RDYi, no particular processing is executed, but the processing of "task existing in RDYi (R(i−1))" is terminated.

In the task activation (R(i−1)11), if there exists any other task which has been suspended to activate a task higher in priority, or to start a subtask and wait for results of processing by the subtask, it is determined e.g. from resumption information, referred to hereinafter, whether the suspended task can be resumed or not. If the suspended task can be resumed, the processing of (suspended task existing) & (resumption permitted) (R(i−1)111) is executed. In this processing, the suspended task is registered as the active task TCBr0 at R(i−1)111, and if there are any saved data or the like, these data are restored or returned at R(i−1)1112, followed by newly starting the RUN processing at R(i−1)1113. According to generation of this event, task (CT1) is activated in the RUN processing (CT), referred to hereinafter.

When there is no suspended task, the processing of "no suspended task" is executed at R(i−1)112, and after the processing of "TCBr0←new task name" is executed at R(i−1)1112, the RUN processing is started again at R(i−1)1122. For example, when the task TCBin for activating the main tasks is to be executed, in the processing of task activation (R311), the processing of "TCBr0←TCBin (R31121)" is executed in "no suspended task (R3112)", and then the RUN processing is started at R31122.

On the other hand, if there is a suspended task but the resumption of the suspended task is inhibited, the permission of resuming the suspended work has to be awaited, so that the task activation (R(i−1)11) is terminated without executing any processing. It should be noted that since the above-mentioned subtask is normally set to a higher priority than the originating task, generally, the subtask has already been terminated, permitting the originating task to be resumed when the task initiation (R(i−1)11) is processed.

Next, the mailbox (MBX) processing will be described with reference to FIG. 14. In this processing, in the case of "task existing in MBX (M1)", the task TCBm0 in the mailbox MBX is registered at M11 in a priority RDYj according to a priority specified for the task. In the case of "MBX containing mail (M2)", if the mail is a suspension-requesting mail (M21), it is registered as a newest request mail at M211, and sent to the active task TCBr0 at M212, whereas if the mail fulfills the conditions of "(response mail)+(termination-notifying mail)" at M22, it is registered as a response mail in response to the newest request mail (at M221) and sent to a reply-waiting RDY (at M222).

Next, the event-responsive processing (E) will be described. Although the initialization (In) is described as a different kind of processing from this processing for the convenience of explanation, it is actually a kind of event-responsive processing (E). That is, the event-responsive processing (E) registers a task created by an event from the outside of the CPU, such as a manipulation of the operating dial 23, or a task created for execution of a program for internal processing, in the mailbox MBX at E1. For example, after registration in the mailbox MBX, the task TCBin for starting the main tasks is registered in the priority RDY, and then executed as a new task by the (RUN) processing described below.

Figure 16:
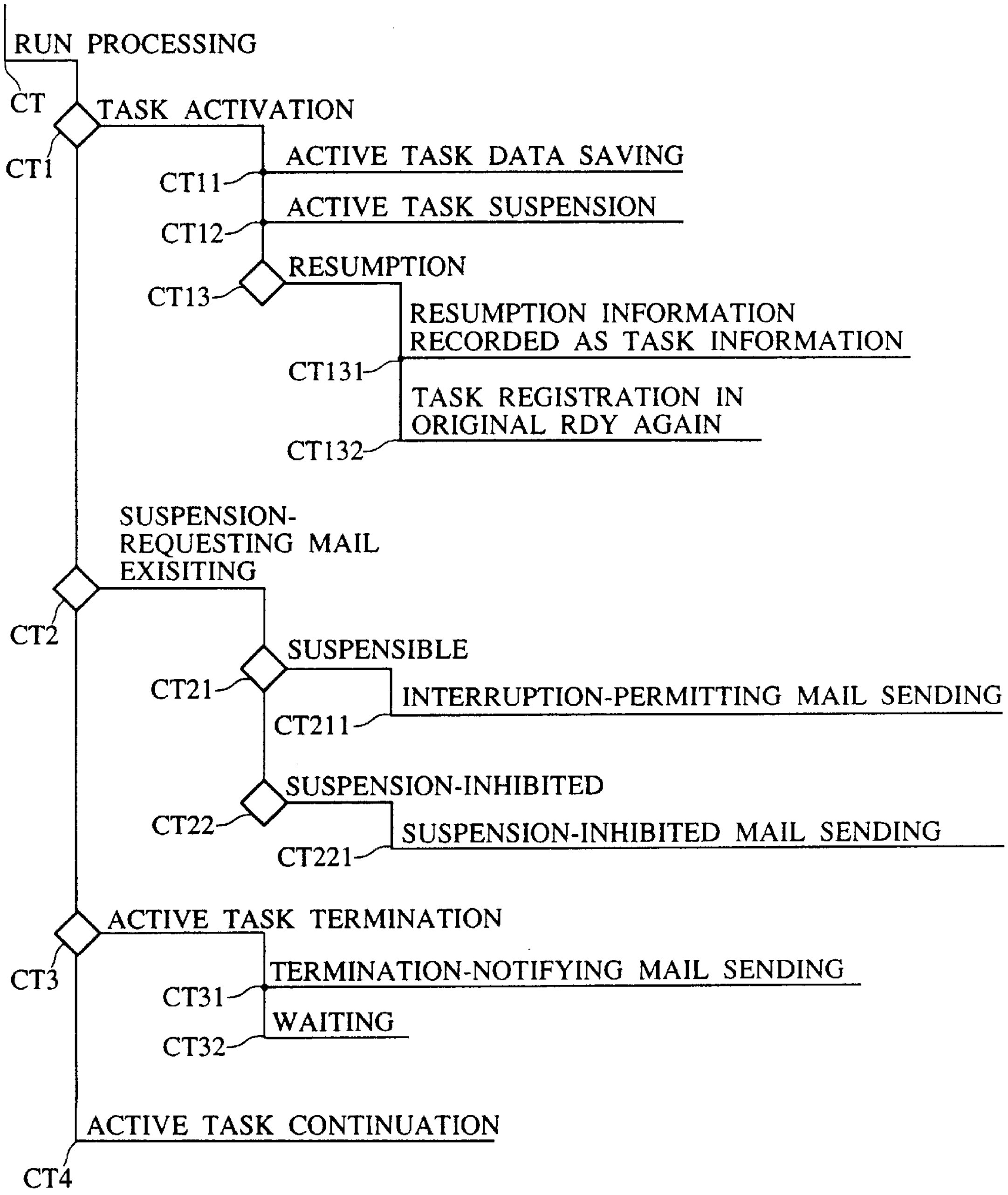
FIG. 16 is a hierarchical operation diagram of active task-executing processing executed by the stamp-making apparatus.

Now, the active task run (RUN) processing (CT) will be described with reference to FIG. 16. This processing continues the active task TCBr0 when there is no other event generated as described above. During this processing, there occur events of "task activation (CT1)", "suspension-requesting mail existing (CT2)" and "active task termination (CT3)". If these events do not occur, the processing of the active task is continued at CT4. If another task is to be activated at CT1, data of the active task being executed is saved at CT11, and then the active task is suspended at CT12. If resumption of the task is expected at CT13, resumption information, is recorded as task information at CT131, based on which the task is registered again in the original priority RDY at CT132.

When the suspension-requesting mail existing at CT2, it is determined whether or not the active task is in a suspensible state. If the active task is suspensible at CT21, an interruption-permitting mail is sent to the mailbox MBX at CT211, while if it is not suspensible at CT22, a suspension-inhibited mail is sent at CT221. It should be noted that although similar processing is executed to temporarily suspend the RUN processing, when the RUN processing (CT) being executed is switched to the RDY processing (R), the MBX processing (M) or the event-responsive processing (E), this processing is a basic routine for real-time monitoring which is different from the processing of switching to the other tasks, and hence description thereof is omitted. When the active task TCBr is terminated at CT3, the termination-notifying mail is transmitted to the mailbox at MBX CT31, and the following task activation is awaited at CT32.

Figure 17:
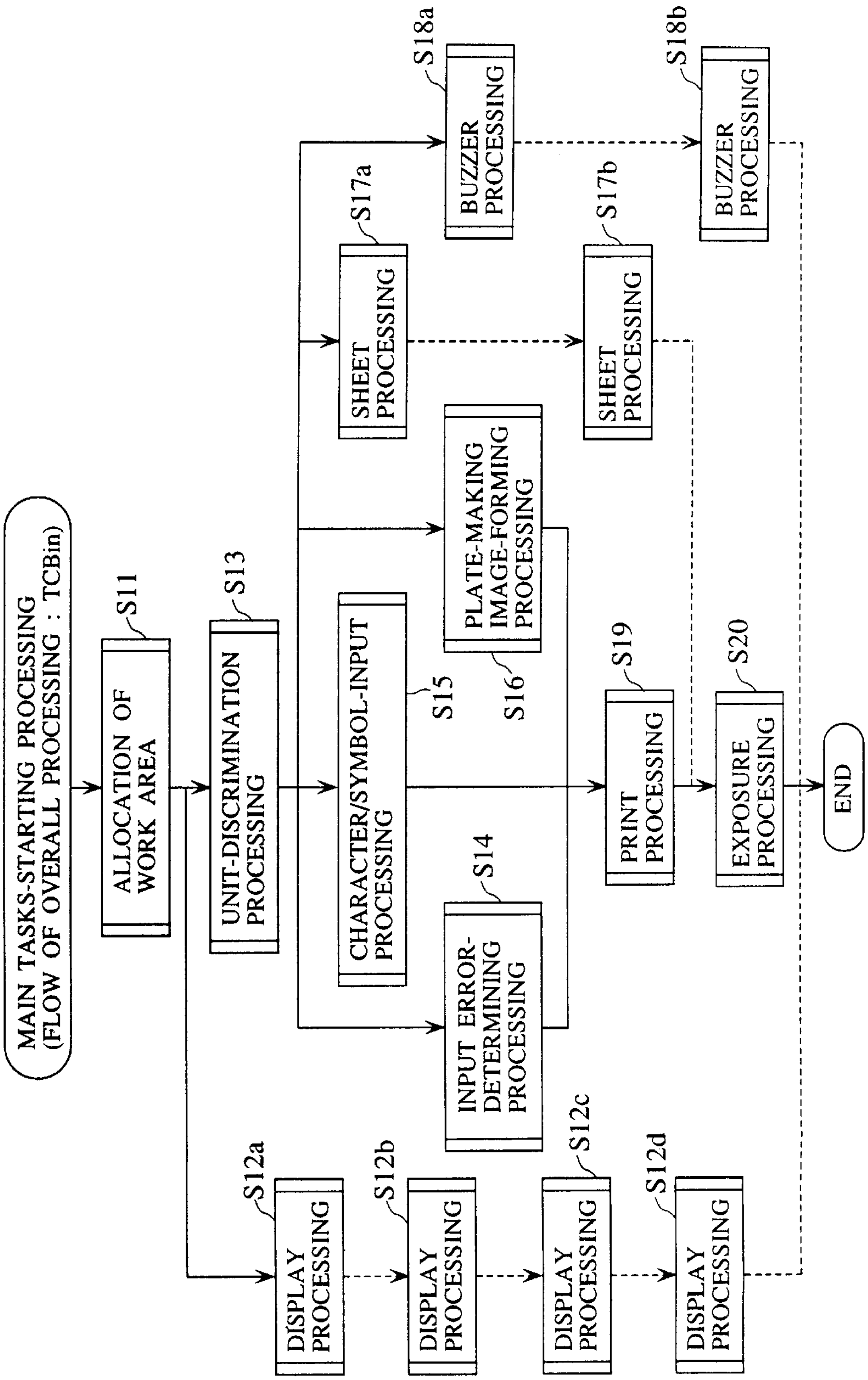
FIG. 17 is a flowchart of an example of main tasks-starting processing executed by the stamp-making apparatus.

FIG. 17 shows an example of the main tasks-starting processing. As shown in the figure, when the main tasks-starting processing task TCBin is activated, first, a task of allocating work area is registered in the mailbox MBX at a step S11, and then a task of display processing and a task of unit (stamp body)-discriminating processing are registered in the mailbox MBX at respective steps S12 and S13. Then, a task of input error-determining processing is registered at a step S14, a task of character/symbol-input processing at a step S15, a task of plate-making image (stamp image)-forming processing at a step S16, a task of sheet processing at a step S17, and a task of buzzer processing at a step S18. Then, after a task of print processing is registered at a step S19, a task of exposure processing is registered at a step S20. The MBX processing classifies these subtasks according to the order of priority and registers each of them in a proper priority RDYj, and then the RDY processing causes them to be activated one after another. Further, after these subtasks are started, subtasks of the subtasks are registered in the mailbox MBX as required and each of them is activated by the RDY processing.

That is, a plurality of tasks including the task TCBin of the initialization continue to be executed until they are each eventually delayed or placed in a wait state. The internal processing of the stamp-making apparatus 1 proceeds to a next step by the multitasking described above when another task as a cause of the wait state of a task has progressed to be deactivated, so that eventually, the internal processing of the multitasking enters a state in which an entry or other operation by the user is awaited. Conversely, once the user operates, the tasks therefor including error handling tasks are sequentially carried out, and eventually the program enters a state in which another operation by the user is awaited.

Therefore, the user actually feels that various processing operations or tasks are executed in parallel and simultaneously. That is, according to the processing of the present stamp-making apparatus 1, compared with a manner of processing in which the processing proceeds to a next step each time only in response to an operation by the user, various kinds of processing operations which will be required to be executed later can be executed in advance, whereby a time period during which the man or user has to wait can be minimized, enabling high-speed processing to be attained. It should be noted that parallel processing, such as the multitasking processing described above, can be realized by forming the program or all the tasks described above by interrupt handlers and employing an interrupt control circuit which controls the order of priority of interrupts generated.

The dotted lines appearing in FIG. 17 show that tasks appear to be simultaneously executed in parallel with each other. Further, the task of character/symbol-input processing (step S15),the task of input error-determining processing (step S14), and the task of plate-making image-forming processing (step S16) are simultaneously executed. More specifically, after a first entry of characters or the like (letters, symbols, figures, or the like) is effected, and before the following entry of characters or the like is effected (step S15), it is determined at the step S14 whether or not there is an inconvenience in the number of characters entered in a text, and an image for use in the plate-making is formed at the step S16. In the course of executing these steps, if a character entry is carried out at the step S15, the task of the input error-determining processing (S14) and that of the plate-making image-forming processing (step S16) are immediately stopped, and then resumed from the start thereof. In the meanwhile, the display processing (step S12, shown as S12*a* to S12*d*) and the buzzer processing (step S18, shown as S18*a* and S18*b*), further, the sheet processing (step S17, shown as S17*a* and S17*b*) responsive to insertion of the plate-making sheet, are being executed in parallel with the above steps.

In the case of the stamp-making apparatus 1, essential parts and elements of the stamp-making method and apparatus of the present invention are mainly implemented by the control block 300, the operating block 21 and the stamp-detecting block 66. Features of operations executed by the stamp-making apparatus 1 will be described with reference to FIGS. 18 to 29B.

Figure 18:
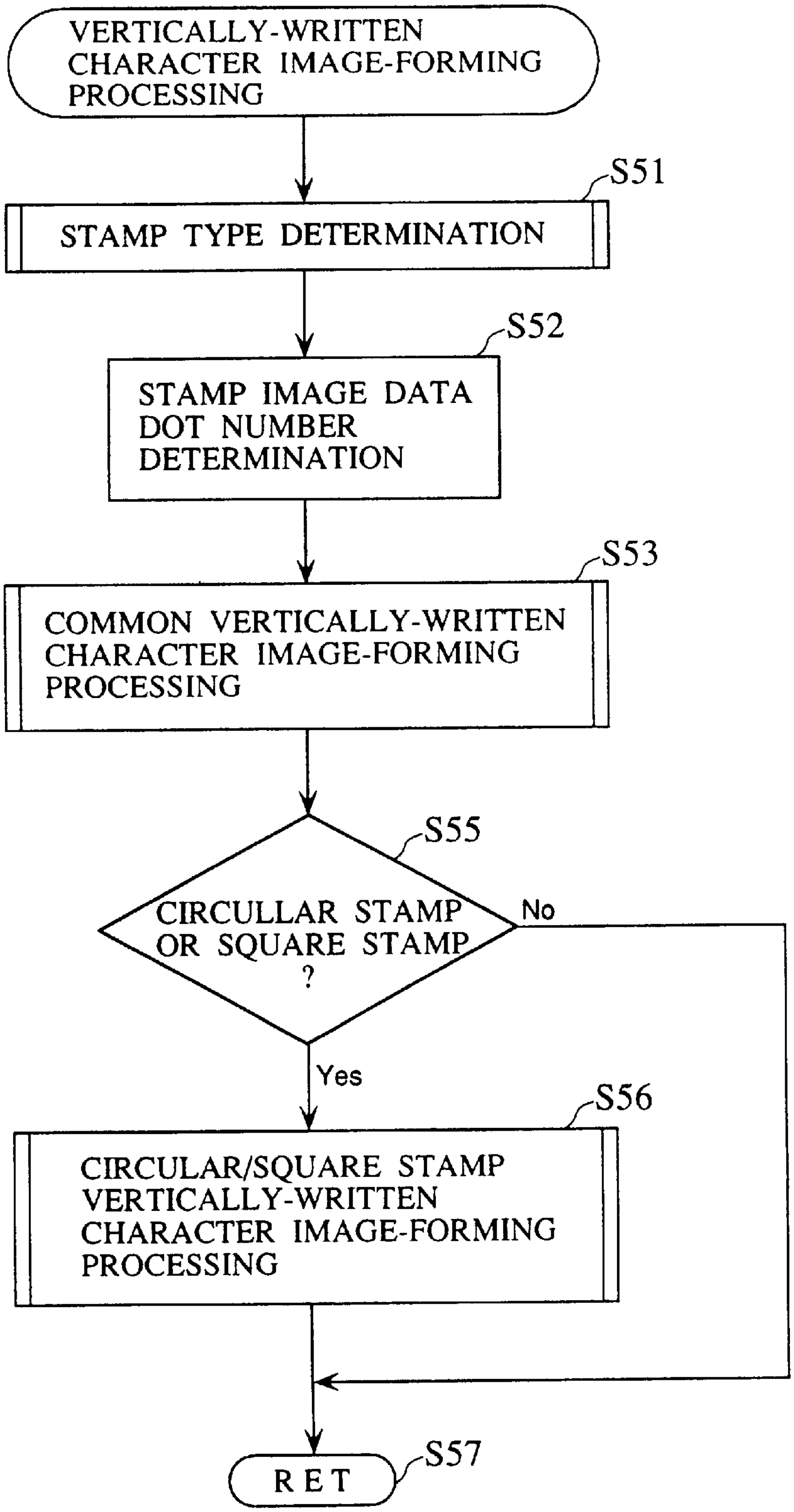
FIG. 18 is a flowchart of vertically-written character image-forming processing of the stamp-making method according to the embodiment.

As shown in FIG. 18, the stamp-making apparatus 1 according to the embodiment of the invention executes vertically-written character image-forming processing. This processing is a subtask initiated from the plate-making image-forming processing (step S16). Since the plate-making image-forming processing (step S16) is resumed whenever a new entry of characters or the like is effected by the character/symbol-input processing (step S15), the vertically-written character image-forming processing is also resumed each time. Further, the first two steps of FIG. 18, i.e. stamp type determination (step S51) and stamp image data dot number determination (step S52) are already executed by the unit-determining processing (step S13), and a circular or square stamp determination (step S55) and frame data existence determination (step S540 in FIG. 19) are executed by the character/symbol-input processing (step S15), so that actually, at these steps in FIGS. 18 and 19, information obtained by the processing at the steps S13 and S15 in FIG. 17 is only referred to. However, for explanation purposes, the routines are included in the FIG. 18 flowchart.

When the vertically-written character image-forming processing is started, first, it is determined at a step S51 whether or not the stamp body A has been set (mounted), and if the stamp body A has been set, then it is determined to what type the stamp body A belongs. The stamp body A has a top-indicating mark printed thereon, which indicates a top side of the stamp surface, and the user can properly set the stamp body A in the pocket 6 of the stamp body-making apparatus 1 with reference to the top-indicating mark. If it is determined at the step S51 that the stamp body A has been mounted, the number of dots of the stamp image data is determined at the step S52, and then common vertically-written character image-forming processing is executed at a step S53. Then, it is determined at a step S53 whether or not the stamp body A having been set is of a circular stamp or square stamp, that is, whether or not the present processing, i.e. the vertically-written character image-forming processing is designated on the stamp body A of the circular stamp or square stamp set in the pocket. If the answer to this question is affirmative (YES), circular/square stamp vertically-written character image-forming processing is executed at a step S56, followed by terminating the present processing (step S57). That is, if it is determined at the step S55 that the vertical writing of characters or the like of the circular or square stamp is designated, vertically-arranged vertically-written image data is obtained by the circular/square stamp-vertically-written character image-forming processing, and used as the stamp image data in the following processing, such as the print processing (step S19) in FIG. 17 and the exposure processing (step S20), whereas if it is determined at the step S55 that the same is not designated, predetermined vertically-written character image data obtained by the common vertically-written character image-forming processing is used as the stamp image in the same following processing.

The designation of vertical writing of stamp images (i.e. forming vertically-written stamp images (of characters)) for the circular or square stamp, which is referred to at the step S55, is executed by depressing a predetermined push button of the push button group 22 of the operating block 21 to thereby display the present configurations or settings of the apparatus on the display 24, and operating the operating dial 23 to change the displayed configurations as desired. When "vertical/horizontal" is displayed, the execution key 31 of the operating dial 2 is pushed to thereby cause either "horizontal writing" or "vertical writing" to be displayed on the display 24. After selecting "vertical writing" or causing the "vertical writing" to be displayed on the operating dial 23, the execution key 31 is pushed to thereby designate or select the vertical writing of stamp images of the circular/ square stamp. The results of this selection are stored in the apparatus 1 until the apparatus 1 is reset or configured again.

Figure 19:
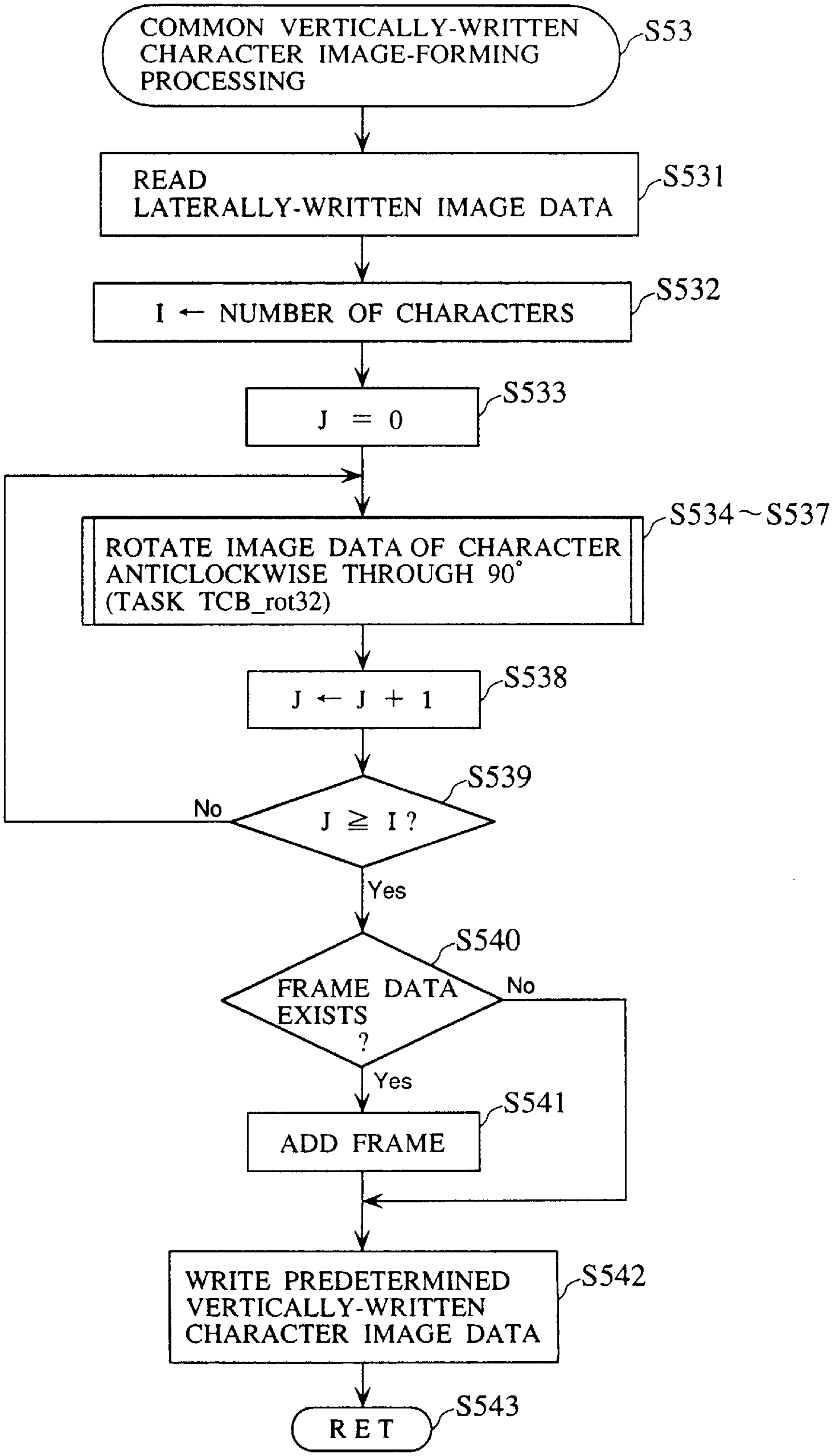
FIG. 19 is a flowchart of common vertically-written character image-forming processing of the stamp-making method.
Figures 20A, 20B:
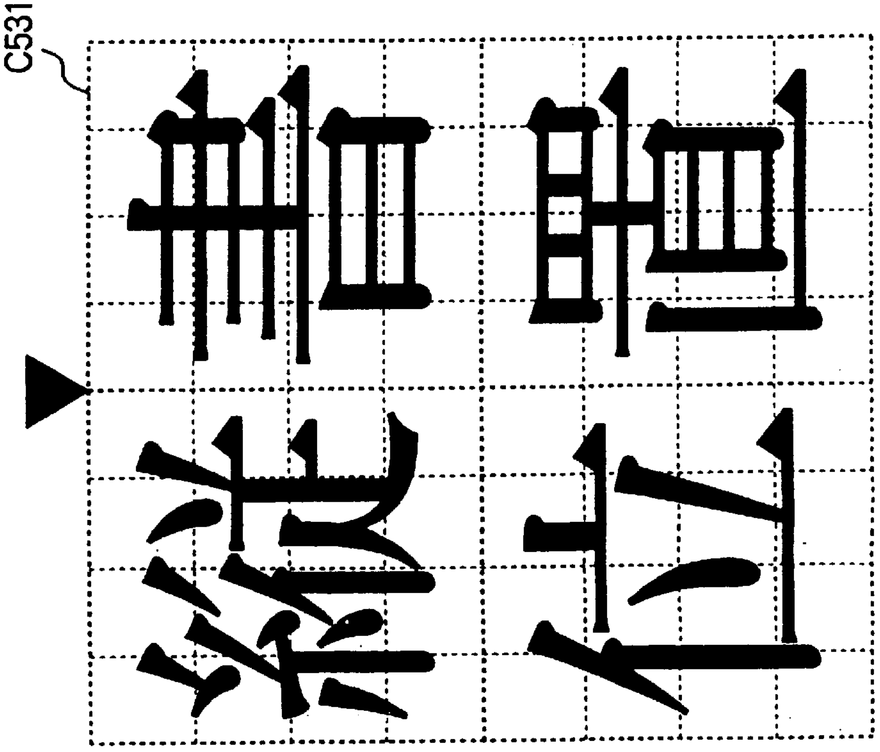
FIG. 20A is a diagram of an example of an image of ordinary laterally-written characters used by the stamp-making method according to the embodiment.
FIG. 20B is a diagram of a simplified data matrix of the FIG. 20A image.

In the common vertically-written character image-forming processing at the step S53, first, as shown in FIG. 19, laterally-written character image data reading is executed at a step S531. For example, assuming that text data of characters as a source of images, such as letters and symbols entered, is formed by a first lateral line formed of two kanji characters "縦書" and a second lateral line formed of two kanji characters "漢字" laterally-written character image data as show in FIGS. 20A and 20B are formed in advance in a conventional manner, so that at the step S531, this laterally-written character image data is read in. FIGS. 20A and 20B show four characters each formed by 32×32 pixels or dots, i.e. image data of 64×64 pixels or dots representing the four characters "縦書 漢字" as an image (FIG. 20A) and a simplified matrix (FIG. 20B) therefor, respectively. In the following description referring to pairs of figures useful in explaining such image data, each image, which fully represents data thereof, is regarded as an equivalent to image data, and therefore called "image data" and regarded as a representation of the image data. Various sizes of image data are available for selection according to the type of a stamp body A and depending on whether a stamp frame is used or not. In the present embodiment, description will be made assuming that the size of 64×64 dots is adopted and at the same time stamp image data for a square stamp with a frame is formed. Further, the whole of the image data (FIG. 20A) is shown in a manner corresponding to a matrix (FIG. 20B) which is divided into divisional matrices each corresponding to a portion of 8×8 dots. Number within each divisional matrix designates a matrix number used in the following description to discriminate each divisional matrix from the rest. Further, a mark ▼ shown on the top of each of image data and a matrix therefor represents a position of the top-indicating mark printed on the stamp body A on which is to be engraved the stamp image. Further, as can be seen from an example of image data C531 (FIG. 21A1) and a matrix M531 (FIG. 21B1) therefor as well as the laterally-written character image data reading executed at the step S531 in FIG. 19, a processing step (S???), image data (C???), and a matrix (M???) correspondent to each other are designated by an identical number (???) in each reference numeral.

As shown in FIGS. 19 and 21A1 to 21B6, when the laterally-written character image data reading is terminated at the step S531, the number of characters is entered as a constant I (I=4, in the present case) at a step S532, and a variable J is set to "0" (J=0) at a step S533. Then, image data of No. J character (J=0, 1, 2, . . . I−1: in the present case, J=0, 1, 2, 3) of I characters is rotated anticlockwise through 90° at steps S534 to S537. In the illustrated example, first, when J=0, image data of "縦" which corresponds to divisional matrix Nos. 10 - 1F is rotated by one character image data-rotating processing ("task TCB_rot32"), referred to hereinafter, at the step S534 (see FIG. 21A2), and then increment of J=J+1 is effected at a step S538 to set J=1. In this case, the resulting image data No. J≧I does not hold at the following step S539, so that image data of "書" designated by divisional matrix Nos. 30 - 3F corresponding to J=1 is rotated at a step S535. Similarly, image data of "位" designated by divisional matrix Nos. 00 - 0F corresponding to J=2 is rotated at a step S536 and image data of "置" designated by divisional matrix Nos. 20 - 2F corresponding to J=3 is rotated at a step S537. At this time, the results of increment of J=J+1=4 effected at the step s538 fulfills the condition of J≧I at the step S539, so that the rotation processing is terminated.. Then, it is determined at a step S540 whether or not frame data to be added exists. If the frame data exists, an addition of a frame is executed at a step S541. Whether or not the frame should be added to the stamp image is also set by starting a routine therefor by depressing a predetermined push button of the push button group 22, and effecting selection via the display 24 by the use the operating dial 23 in the same manner as described hereinabove in the selection of "vertical/horizontal". In the illustrated example, description will be made assuming that the addition of the frame was set or selected. Image data C541 (see FIG. 21A6) having the frame added thereto (at the step S541) is stored in the memory as the predetermined vertically-written character image data C541 formed of laterally-arranged vertically-written character images, by the following predetermined vertically-written character image data writing at a step S542, followed by terminating the common vertically-written character image-forming processing at the step S543.

Next, the aforementioned rotation processing, that is, the one character image data-rotating processing (task TCB-rot32) will be described with reference to FIGS. 22 to 24B3.

In this processing, first, image data of 32×32 dots is read at a step S5341. For example, in the FIG. 19 case described above, the first image data to be processed is the image data C5341 of the kanji character "縦" as shown in FIG. 23A1. After the image data to be processed is read in, 16×16 dots image data-rotating processing (also referred to as "task TCB_rot16") is executed to rotate image data at an upper left section corresponding to matrix Nos. 10, 11, 14 and 15 anticlockwise through 90° and copy the same to a lower left section of output image data at a step S5342. It should be noted that in the task TCB_rot16, a task TCB_rot8 for rotating image data of 8×8 dots may be employed, or in stead of the task TCB_rot16, the task TCB_rot8 may be directly employed.

When rotation of the first image data at the upper left section at the step S5342 is completed, then image data at an upper right section, i.e. image data corresponding to matrix Nos. 12, 13, 16 and 17 is similarly rotated and is copied to an upper left section of the output image data at a step S5343. Then, similarly, image data at a lower left section corresponding to matrix Nos. 18, 19, 1C and 1D is rotated and copied to a lower right section at a step S5344, and then image data at a lower right section corresponding to matrix Nos. 1A, 1B, 1E and 1F is rotated and copied to an upper right section at a step S5345, followed by terminating the one character image data-rotating processing at a step S5348.

Now, description will be made of processing executed when the size of a character is not exactly divisible by the rotating means set for use, that is, when the image of one character is formed by dots the number of which is not exactly divisible by the task TCB_rot16 or the task TCB_rot8. For example, when the task TCB_rot8 as rotating means for processing data of 8×8 dots is to be used for processing image data of 44×44 dots as shown in FIGS. 24A1 to 24A4, the image data C5346 (FIG. 24A1) of 44×44 (dr=44) dots for the kanji character "縦" is treated as image data C53461 (FIG. 24A2) of 48×48 dots (di=48). In this case, similarly to the rotation processing of the task TCB_rot32 shown in FIGS. 22 and 23A1 to 23B5, image data C53471 is formed by rotating the image data C53461 anticlockwise through 90°, and image data corresponding to a portion of 44×44 dots of the image data C53471 is extracted to form image data C5347 as an output of the rotation processing.

Figure 26B:
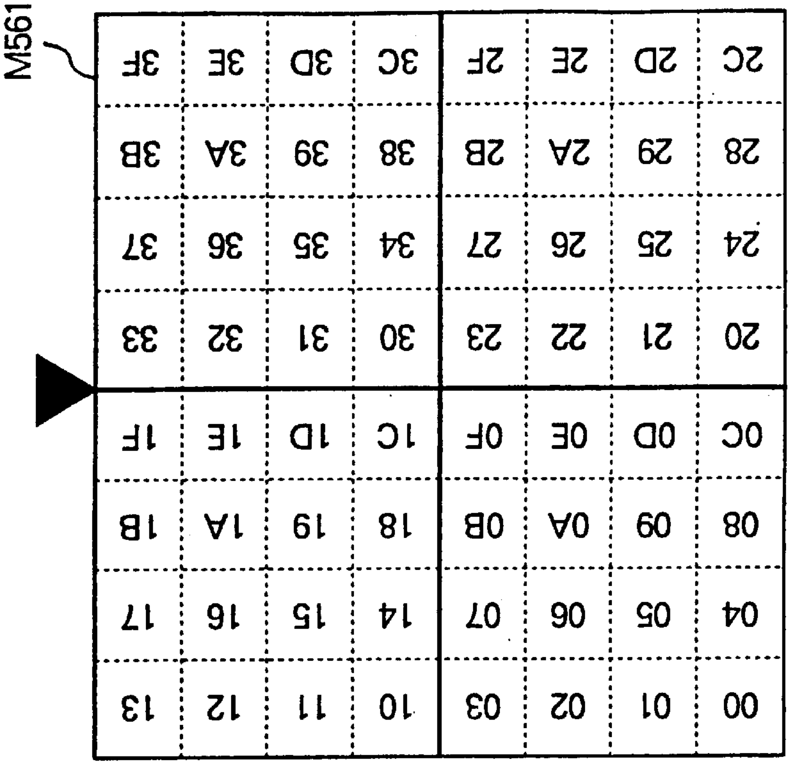
FIGS. 26A and 26B are diagrams of an example of a predetermined vertically-written character image data and a data matrix therefor to be processed by the FIG. 25 processing.
Figure 26A:
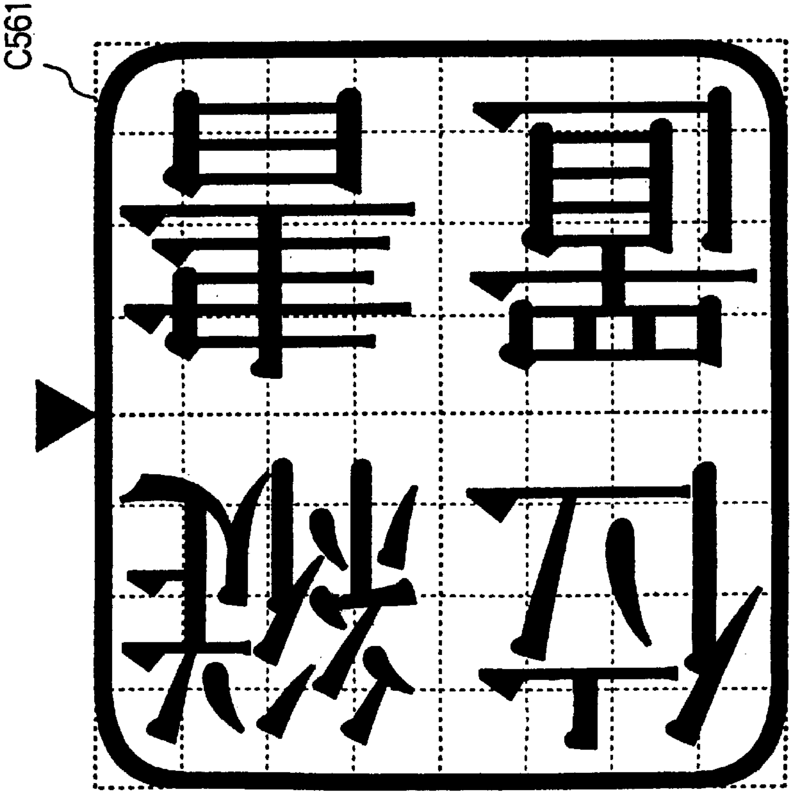
Figure 27:
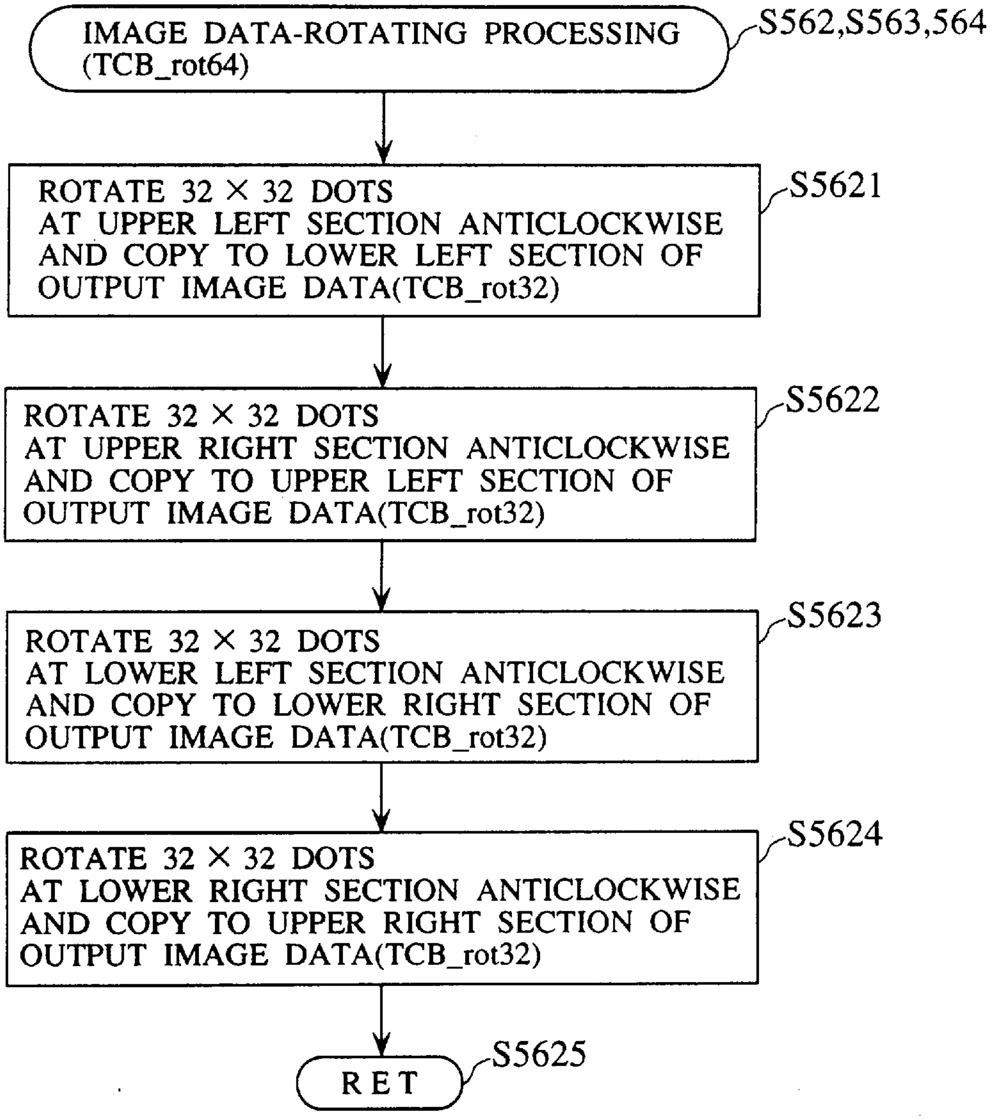
FIG. 27 is a flowchart of image data-rotating processing.
Figure 29B:
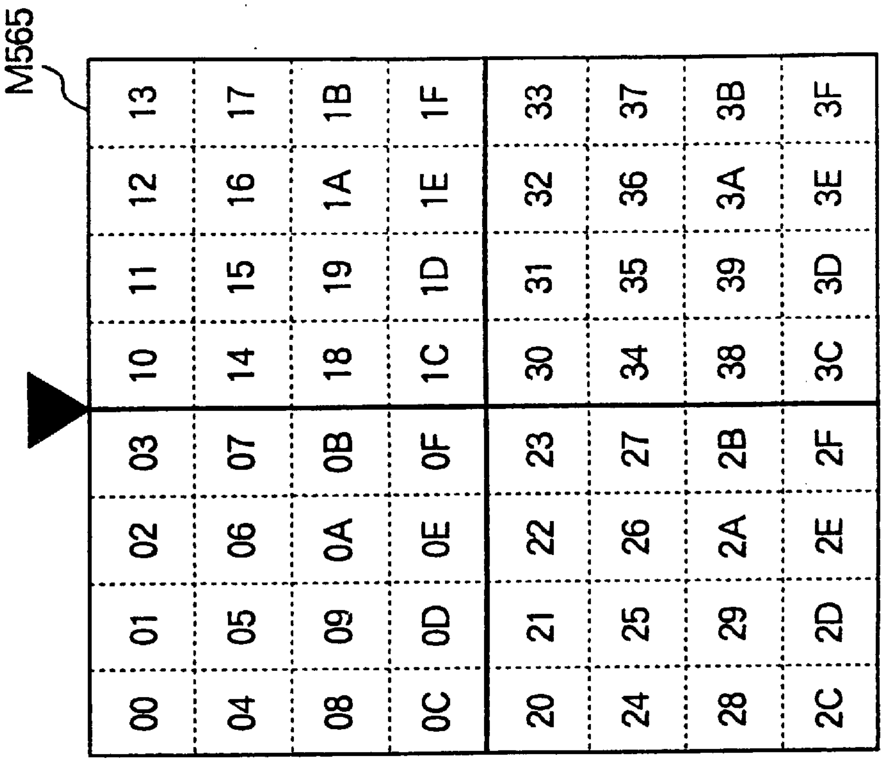
FIGS. 29A and 29B are diagrams of an example of an image of the vertically-arranged vertically-written character data and a data matrix therefor obtained by the FIG. 25 processing.
Figure 29A:
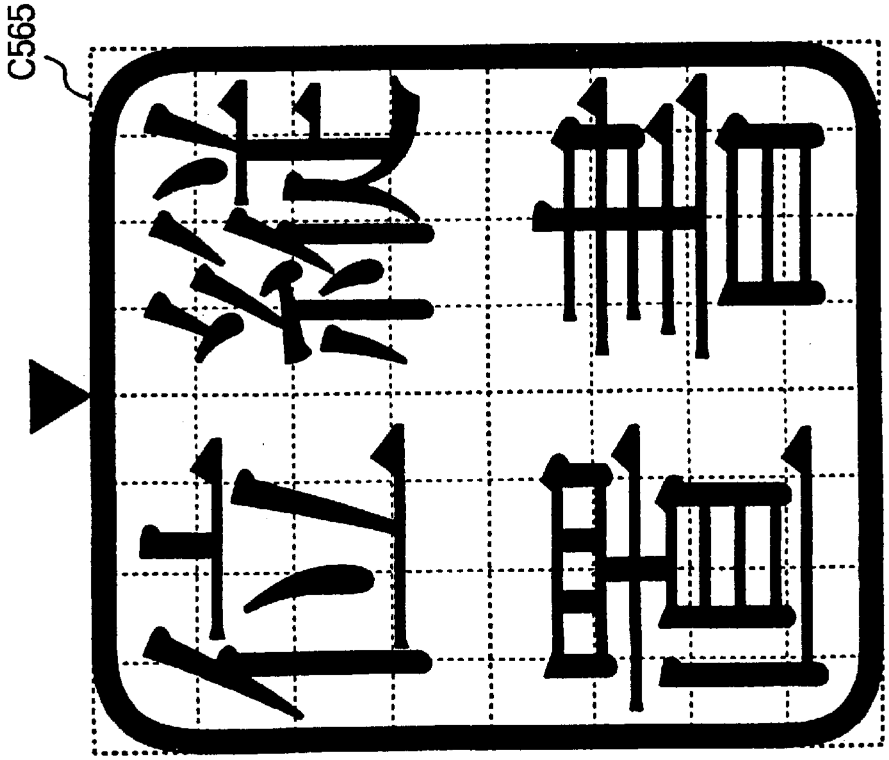

Next, the circular/square stamp vertically-written character image-forming processing in FIG. 18 will be described with reference to FIGS. 25 to 29B. In this processing, first, referring to FIG. 25, the predetermined vertically-written character image data is read at a step S561. The image data C561 read at this step is identical to the image data C541 formed by the common vertically-written character image-forming processing at the step S53, as shown in FIGS. 26A and 26B. Then, the whole image data C561 is rotated by 64×64 dots image data-rotating processing (also referred to as "task TCB_rot64") anticlockwise through 90° at a step S562 (see FIGS. 28A2 and 28B2).

Figure 22:
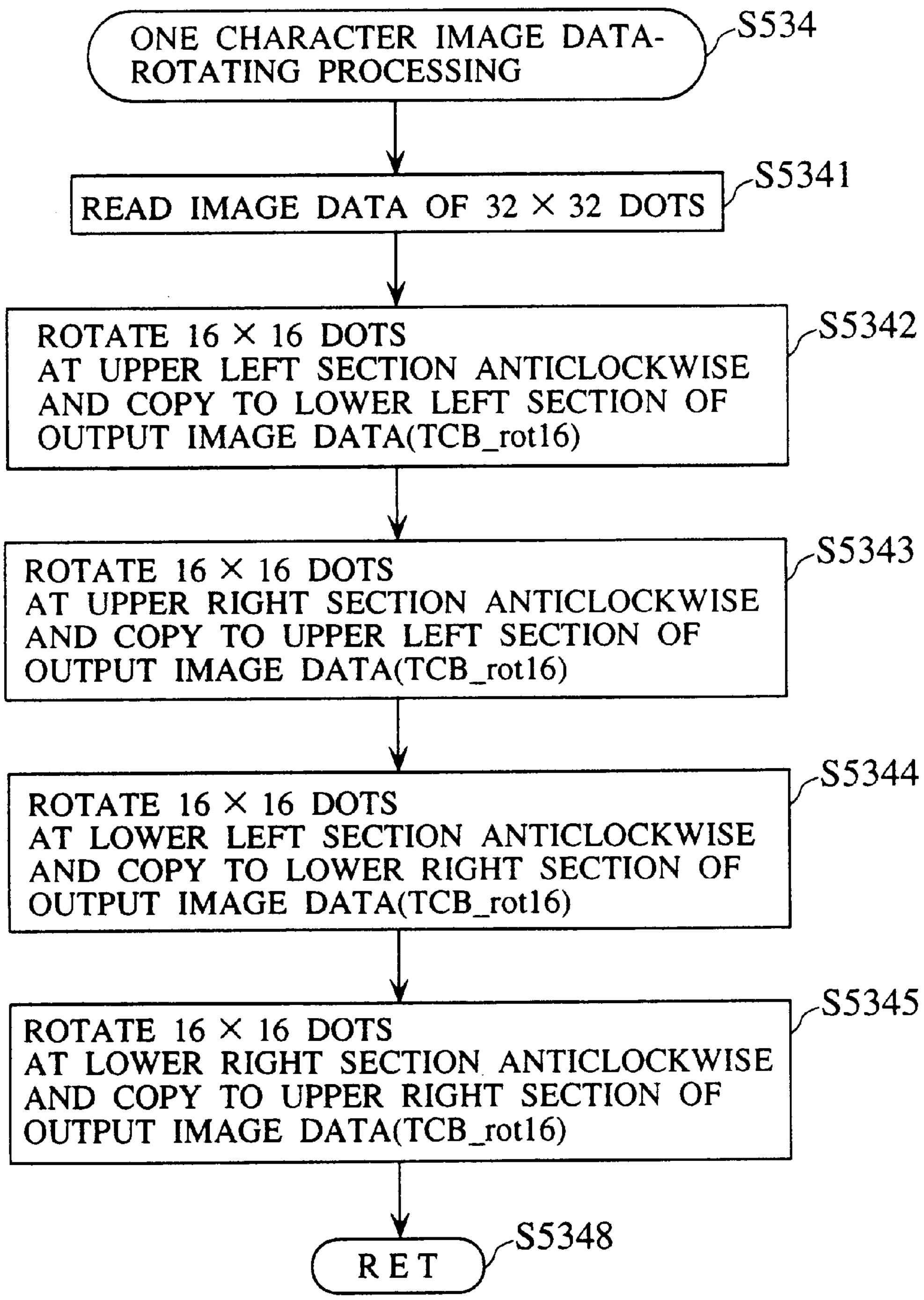
FIG. 22 is a flowchart of an example of one character image data-rotating processing.
Figure 25:
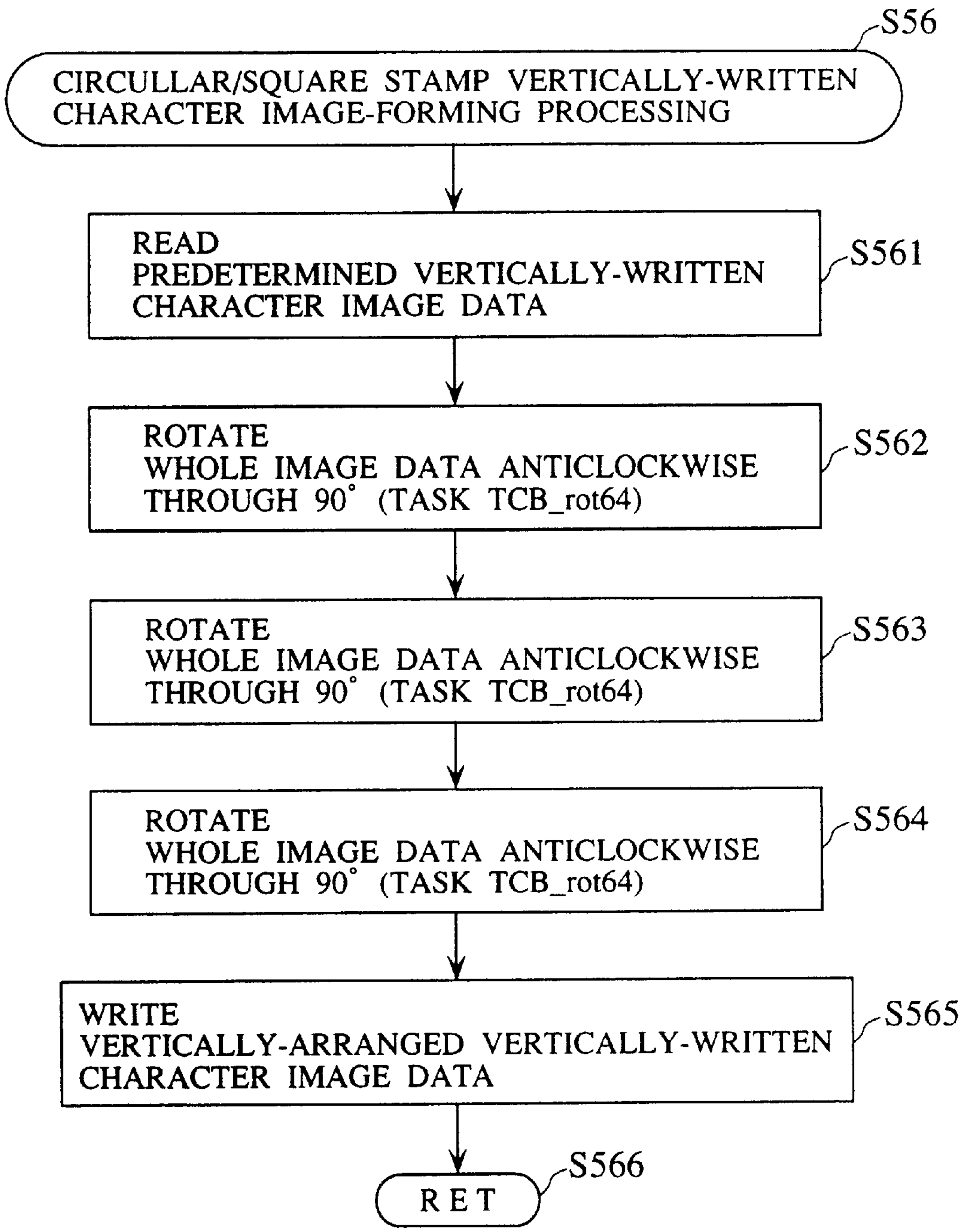
FIG. 25 is a flowchart of circular/square stamp vertically-written character image-forming processing carried out by the stamp-making method of the embodiment.

The image data-rotating processing (by TCB_rot64) can be realized by using the task TCB_rot32 four times, just as the task TCB_rot32 as rotating means of the one character image data-rotating processing (S534) in FIG. 22 is realized by using the task TCB_rot16 as a subtask thereof four times. By first rotation at a step S5621 in FIG. 27, image data of "縦" corresponding to matrix Nos. 10 to 1F in FIG. 26B is rotated anticlockwise through 90° and copied to a lower left section of output image data at a step S5621. Then, similarly, image data of "書" corresponding to matrix Nos. 30 to 3F at an upper right section in FIG. 26B is rotated anticlockwise through 90° and copied to an upper left section of the output image data at a step S5622. Further, similarly, image data of "位" at a lower left section is rotated and copied to a lower right section at a step S5623, and image data of "置" at a lower right section to an upper right section at a step S5624, followed by terminating the processing at a step S5625.

In the circular/square stamp vertically-written character image-forming processing (step S56), as shown in FIGS. 25 and 28A1 to 28B4, the rotation processing is executed in the same manner two times at respective steps S563 and S564, and then the image data C564 as results of the processing is written or stored as the vertically-arranged vertically-written character image data C564 (see FIGS. 29A and 29B) in the memory at a step S565, followed by terminating the circular/square vertically-written character image-forming processing at a step S566.

As described heretofore, according to the stamp-making method of the invention, in the vertically-written character image-forming processing in FIG. 18, if it is determined at the step S55 that the stamp body A set in the pocket 6 of the stamp-making apparatus 1 with reference to the top-indicating mark provided on the stamp body A is of a circular stamp or a square stamp, in other words, if the vertical writing of characters of stamp image data is specified on the stamp body A of a circular stamp or a square stamp, the circular/square stamp vertically-written character image-forming processing is executed at the step S56, and the vertically-arranged vertically-written character image data as an output of this processing is used as the stamp image data for the print processing at the step S19 and the exposure processing at the step S20 in FIG. 17. If it is determined at the step S55 that the vertical writing is not specified on the stamp body A of a circular stamp or a square stamp, the predetermined vertically-written character image data is used as the stamp image data for the print processing and the exposure processing.

Therefore, according to the stamp-making method and apparatus of the present invention, when the vertical arrangement of vertically-written character images is specified, predetermined vertically-written character image data, i.e. image data of laterally-extending lines of vertically-written characters is converted into vertically-arranged vertically-written character image data, i.e. data of images of vertically-extending lines of vertically-written characters, as the stamp image data for use in engraving of the stamp body A, whereby a vertically-written square stamp or a vertically-written circular stamp can be made which bears the top-indicating mark with reference to which the stamp body A was set in the pocket of the stamp-making apparatus and, as a result of the above processing, can be suitably used as a guide when the stamp is imprinted. In the case of laterally-written stamps, the top-indicating mark can be conventionally used as the mark for proper imprinting, so that the user can imprint the stamp properly with reference to the top-indicating mark irrespective of whether the stamp image is formed of images of vertically-written characters or laterally-written characters.

Further, according to the present invention, it is possible to convert the predetermined vertically-written character image data to the vertically-arranged vertically-written character image data by the use of the conventional method of rotating image data, such as the above-mentioned task TCB_rot64. Further, rotation of each laterally-written character image data and conversion of the predetermined vertically-written character image data to the vertically-arranged vertically-written character image data can be effected by the same rotating means, such as the task TCB_rot32, and therefore, the whole apparatus can be simplified compared to a case necessitating provision of additional means.

Although in the above embodiment, the circular/square stamp vertically-written character image-forming processing in which the predetermined vertically-written character image data is converted to the vertically-arranged vertically-written character data is described, this is not limitative, but when the rotational angle of a stamp image of a circular stamp is desired to be slightly shifted from the original position with respect to the top indicating mark on the stamp body, an angle of rotation by the task TCB_rot16 or the task TCB_rot8 employed in the FIG. 22 task TCB_rot32 may be specified via the display 24 and the operating dial 32 of the operating block 21, whereby the stamp image may be rotated through a specified angle and copied to output image data. This enables the stamp image to be rotated through a desired angle.

Therefore, according to the present stamp-making method and apparatus, when the arrangement of an image in a second (vertical) direction is instructed, first direction-oriented image data (corresponding to the predetermined laterally-written character image data C531) in which images are oriented in a first direction is converted to a second direction-oriented image data (corresponding to the vertically-arranged vertically-written character image data C564 in FIG. 28A) in which images are oriented in the second direction, and the resulting image data is used as the stamp image data for engraving stamp bodies. This makes it possible to make a circular or square stamp which permits the use of the top-indicating mark, with reference to which the stamp body was set in the pocket of the apparatus, as a guide in imprinting the stamp. As a result, circular or square stamps thus made enable users to imprint their stamp images accurately with reference to the top-indicating mark without taking the trouble of checking the orientation of each stamp image before the imprinting.

It is further understood by those skilled in the art that the foregoing is a preferred embodiment of the invention, and that various changes and modification may be made without departing from the spirit and scope thereof.

What is claimed is:

1. A stamp-making apparatus for forming characters on a stamp, the stamp defining a stamping direction, the apparatus comprising:

inputting means for inputting a string of characters;

selecting means for selecting one of a horizontal writing direction and a vertical wring direction as a writing direction of the string of characters;

engraving means for forming the string of characters on the stamp; and control means for controlling the arrangement of the string of characters formed on the stamp so that the stamping direction is independent of the selection of the writing direction.

2. The apparatus of claim 1, wherein the engraving means forms a frame on the stamp, the frame having an orientation independent of the selection of the writing direction.

3. The apparatus of claim 2, wherein the frame is a square in shape and has a size independent of the selection of the writing direction.

4. The apparatus of claim 2, wherein the control means controls the arrangement of the string of characters so that the string of characters is formed on the stamp within the frame regardless of the selection of the writing direction.

5. The apparatus of claim 1, wherein an orientation of the characters is in the stamping direction regardless of the selection of the writing direction.

6. A stamp-making apparatus for forming characters on a stamp, the stamp defining a first and a second stamping direction, the apparatus comprising:

inputting means for inputting a string of characters;

selecting means for selecting one of a horizontal writing direction and a vertical writing direction as a writing direction of the string of characters;

engraving means for forming the string of characters on the stamp; and control means for controlling the arrangement of the string of characters formed on the stamp so that an orientation of the characters is in the first stamping direction when the horizontal writing direction is selected and in the second stamping direction when the vertical writing direction is selected.

7. The apparatus of claim 6, wherein the first and second stamping directions are orthogonal to each other.

8. The apparatus of claim 6, wherein the engraving means forms a frame on the stamp, the frame having an orientation independent of the selection of the writing direction.

9. A stamp-making apparatus for forming characters on a stamp, the stamp defining a first and a second stamping direction, the stamp being one of a first type of shape having the same size in the first and second stamping directions and a second type of shape having different sizes in the first and second stamping directions, the apparatus comprising:

inputting means for inputting a string of characters;

means for determining whether the stamp is of the first or the second type of shape;

selecting means for selecting one of a horizontal writing direction and a vertical writing direction as a writing direction of the string of characters;

engraving means for forming the string of characters on the stamp; and control means for controlling the arrangement of the string of characters formed on the stamp, so that if the stamp is of the first type of shape, an orientation of the characters is in the first stamping direction independent of the selection of the writing direction, and if the stamp is of the second type of shape, the orientation of the characters is in the first stamping direction when the horizontal writing direction is selected and in the second stamping direction when the vertical writing direction is selected.

10. The apparatus of claim 9, wherein the engraving means forms a frame on the stamp, the frame having an orientation independent of the selection of the writing direction.

11. A stamp-making apparatus for forming characters on a stamp, the stamp defining a stamping direction, the apparatus comprising:

an input panel having input keys for inputting a string of characters;

a selection device having selection keys for selecting one of a horizontal writing direction and a vertical writing direction as a writing direction of the string of characters;

an engraver for forming the string of characters on the stamp; and a controller for controlling the arrangement of the string of characters formed on the stamp so that the stamping direction is independent of the selection of the writing direction.

12. The apparatus of claim 11, wherein the engraver forms a frame on the stamp, the frame having an orientation independent of the selection of the writing direction.

13. The apparatus of claim 12, wherein the frame is a square in shape and has a size independent of the selection of the writing direction.

14. The apparatus of claim 12, wherein the control means controls the arrangement of the string of characters formed on the stamp so that the string of characters is printed within the frame regardless of the selection of the writing direction.

15. The apparatus of claim 11, wherein an orientation of the characters is in the stamping direction regardless of the selection of the writing direction.

16. A stamp-making apparatus for forming characters on a stamp, the stamp defining a first and a second stamping direction, the apparatus comprising:

an input panel having input keys for inputting a string of characters;

a selection device having selection keys for selecting one of a horizontal writing direction and a vertical writing direction as a writing direction of the string of characters;

an engraver for forming the string of characters on the stamp; and a controller for controlling the arrangement of the string of characters formed on the stamp so that an orientation of the characters is in the first stamping direction when the horizontal writing direction is selected and in the second stamping direction when the vertical writing direction is selected.

17. The apparatus of claim 16, wherein the first and second stamping directions are orthogonal to each other.

18. The apparatus of claim 16, wherein the engraver forms a frame on the stamp, the frame having an orientation independent of the selection of the writing direction.

19. A stamp-making apparatus for forming characters on a stamp, the stamp defining a first and a second stamping direction, the stamp being either of a first type of shape having the same size in the first and second stamping directions or of a second type of shape having different sizes in the first and second stamping directions, the apparatus comprising:

an input panel having input keys for inputting a string of characters;

a detector which reads an identification mark on the stamp to determine whether the stamp is of the first or the second type of shape;

a selection device having selection keys for selecting one of a horizontal writing direction and a vertical writing direction as a writing direction of the string of characters;

an engraver for forming the string of characters on the stamp; and a controller for controlling the arrangement of the string of characters formed on the stamp, so that if the stamp is of the first type of shape, an orientation of the characters is in the first stamping direction independent of the selection of the writing direction, and if the stamp is of the second type of shape, the orientation of the characters is in the first stamping direction when the horizontal writing direction is selected and in the second stamping direction when the vertical writing direction is selected.

20. The apparatus of claim 19, wherein the engraver forms a frame on the stamp, the frame having an orientation independent of the selection of the writing direction.

21. A stamp-making method for forming characters on a stamp, the stamp defining a stamping direction, the method comprising:

inputting a string of characters;

selecting one of horizontal writing direction and a vertical writing direction as a writing direction of the string of characters; and forming the string of characters on the stamp, wherein the string of characters are formed on the stamp so that the stamping direction is independent of the selection of the writing direction.

22. The method of claim 21, further comprising forming a frame on the stamp, the frame having an orientation independent of the selection of the writing direction.

23. The apparatus of claim 22, wherein the frame is a square in shape and has a size independent of the selection of the writing direction.

24. The apparatus of claim 22, wherein the control means controls the arrangement of the string of characters formed on the stamp so that the string of characters is printed within the frame regardless of the selection of the writing direction.

25. The apparatus of claim 21, wherein an orientation of the characters is in the stamping direction regardless of the selection of the writing direction.

26. A stamp-making method for forming characters on a stamp, the stamp defining a first and a second stamping direction, the method comprising:

inputting a string of characters;

selecting one of a horizontal writing direction and a vertical writing direction as a writing direction of the string of characters; and forming the string of characters on the stamp, wherein the string of characters are formed on the stamp so that an orientation of the characters is in the first stamping direction when the horizontal writing direction is selected and in the second stamping direction when the vertical writing direction is selected.

27. The method of claim 26, wherein the first and second stamping directions are orthogonal to each other.

28. The method of claim 26, further comprising forming a frame on the stamp, the frame having an orientation independent of the selection of the writing direction.

29. A stamp-making method for forming characters on a stamp, the stamp defining a first and a second stamping direction, the stamp being either of a first type of shape having the same size in the first and second stamping directions or of a second type of shape having different sizes in the first and second stamping directions, the method comprising:

inputting a string of characters;

determining whether the stamp is of the first or the second type of shape;

selecting a horizontal writing direction or a vertical writing direction as a writing direction of the string of characters; and forming the string of characters on the stamp, wherein the string of characters are formed on the stamp so that if the stamp is of the first type of shape, an orientation of the characters is in the first stamping direction independent of the selection of the writing direction, and if the stamp is of the second type of shape, the orientation of the characters is in the first stamping direction when the horizontal writing direction is selected and in the second stamping direction when the vertical writing direction is selected.

30. The method of claim 29, further comprising forming a frame on the stamp, the frame having an orientation independent of the selection of the writing direction.

* * * * *

UNITED STATES PATENT AND TRADEMARK OFFICE

CERTIFICATE OF CORRECTION

PATENT NO. : 6,181,433 B1
DATED : January 30, 2001
INVENTOR(S) : Hitoshi Hayama; Kenji Watanabe; Takanobu Kameda; Tomoyuki Shimmura It is certified that error appears in the above-identified patent and that said Letters Patent is hereby corrected as shown below:

Title page,
Item [30], should read change "6-341990" to --7-341990 --.

Signed and Sealed this

Twenty-eighth Day of August, 2001

Attest:

Nicholas P. Godici

NICHOLAS P. GODICI

*Attesting Officer* — *Acting Director of the United States Patent and Trademark Office*